United States Patent
Stanton et al.

(10) Patent No.: US 11,611,124 B2
(45) Date of Patent: Mar. 21, 2023

(54) BATTERY PACK

(71) Applicant: BLACK & DECKER INC., New Britain, CT (US)

(72) Inventors: Matthew J. Stanton, Rockville, MD (US); Matthew J. Velderman, Baltimore, MD (US); Daniel J. White, Baltimore, MD (US); Kevin Alston, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 347 days.

(21) Appl. No.: 16/515,831

(22) Filed: Jul. 18, 2019

(65) Prior Publication Data

US 2020/0052257 A1 Feb. 13, 2020

Related U.S. Application Data

(60) Provisional application No. 62/700,036, filed on Jul. 18, 2018.

(51) Int. Cl.
*H01M 50/20* (2021.01)
*H01M 50/247* (2021.01)
*H01M 50/262* (2021.01)
*H01M 50/24* (2021.01)

(52) U.S. Cl.
CPC ........... *H01M 50/20* (2021.01); *H01M 50/24* (2021.01); *H01M 50/247* (2021.01); *H01M 50/262* (2021.01)

(58) Field of Classification Search
CPC .. H01M 50/20; H01M 50/247; H01M 50/262; H01M 50/24
See application file for complete search history.

(56) References Cited

U.S. PATENT DOCUMENTS

| | | | | |
|---|---|---|---|---|
| 2007/0103112 A1* | 5/2007 | Casalena | ............... | H02J 7/0042 320/112 |
| 2007/0277987 A1* | 12/2007 | Meyer | ....................... | B25F 5/02 173/217 |
| 2011/0133496 A1* | 6/2011 | Cooper | ..................... | B25F 5/02 292/341.15 |
| 2013/0008682 A1* | 1/2013 | Turner | ..................... | B25F 5/02 173/217 |
| 2014/0349143 A1* | 11/2014 | Ogura | ............... | H01M 10/6235 429/7 |
| 2018/0311807 A1* | 11/2018 | Sergyeyenko | ........ | H02J 7/0047 |
| 2018/0366697 A1* | 12/2018 | Elfering | ................... | H02J 7/342 |
| 2019/0067655 A1* | 2/2019 | Nakamura | .......... | H01M 10/613 |

* cited by examiner

*Primary Examiner* — Cynthia H Kelly
*Assistant Examiner* — Jenna Shulman
(74) *Attorney, Agent, or Firm* — Michael Aronoff

(57) ABSTRACT

A battery pack having a battery housing that defines a cavity for receiving a plurality of battery cells. The battery pack cavity is sealed from the air outside the battery pack housing to prevent water and other contaminants from reaching the plurality of battery cells. The battery pack may include a sealing material to create a seal between an upper housing and a lower housing of the battery housing. The battery pack also include a sealing material to create a seal around a terminal block of the battery pack.

7 Claims, 39 Drawing Sheets

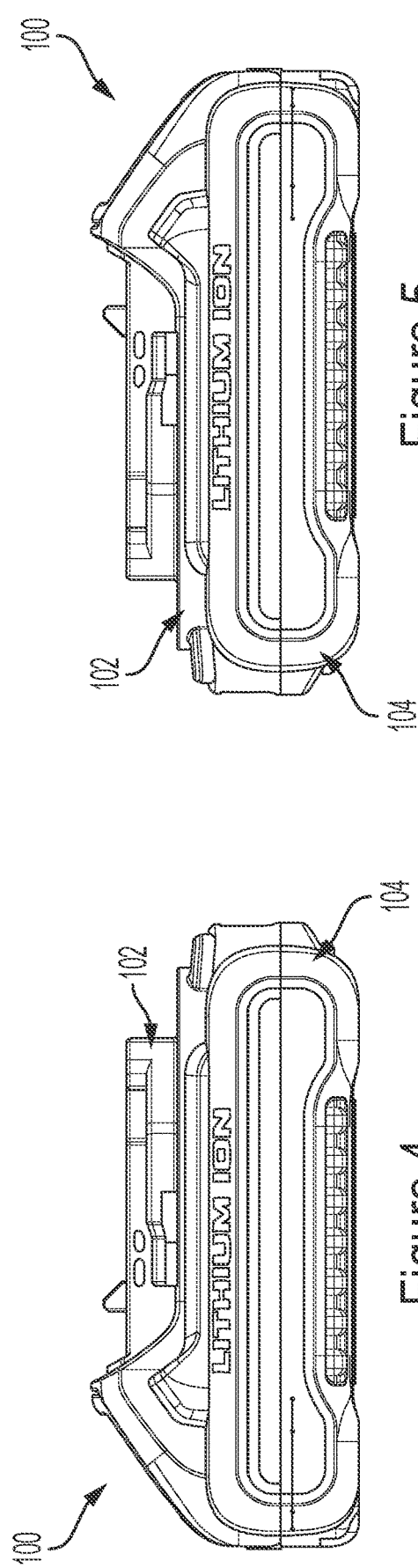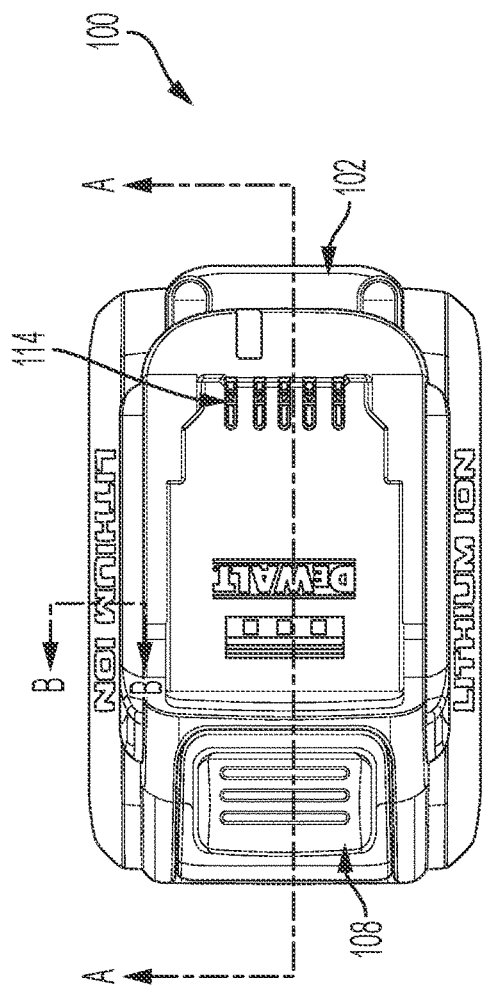

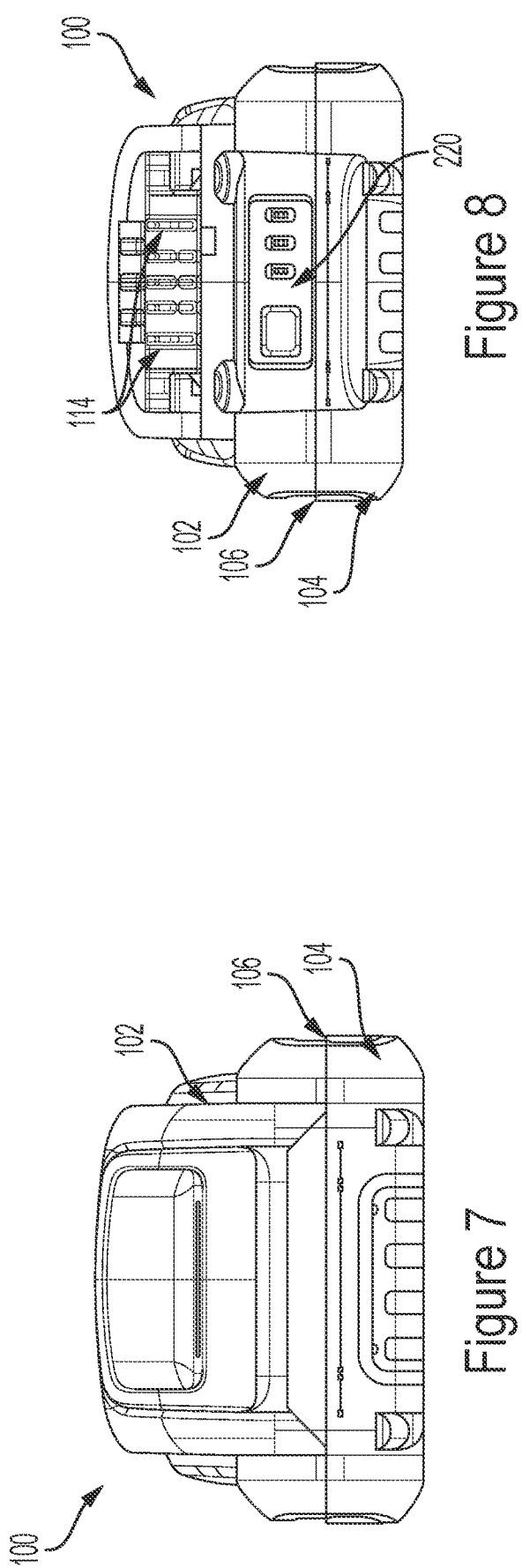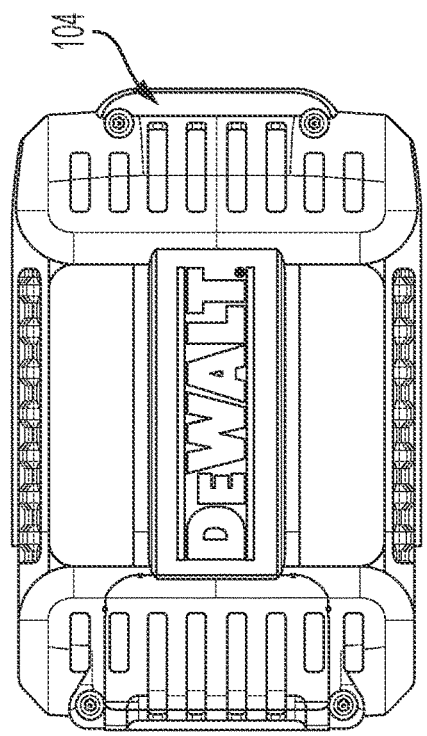

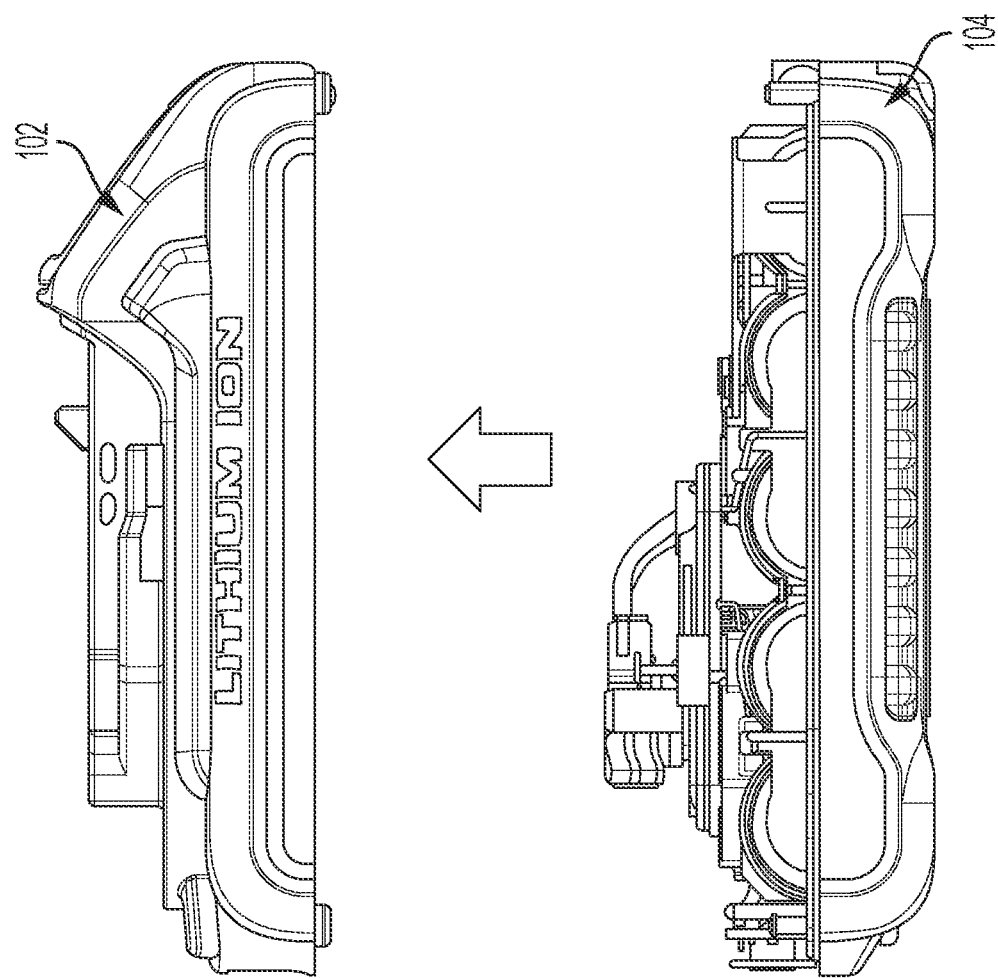

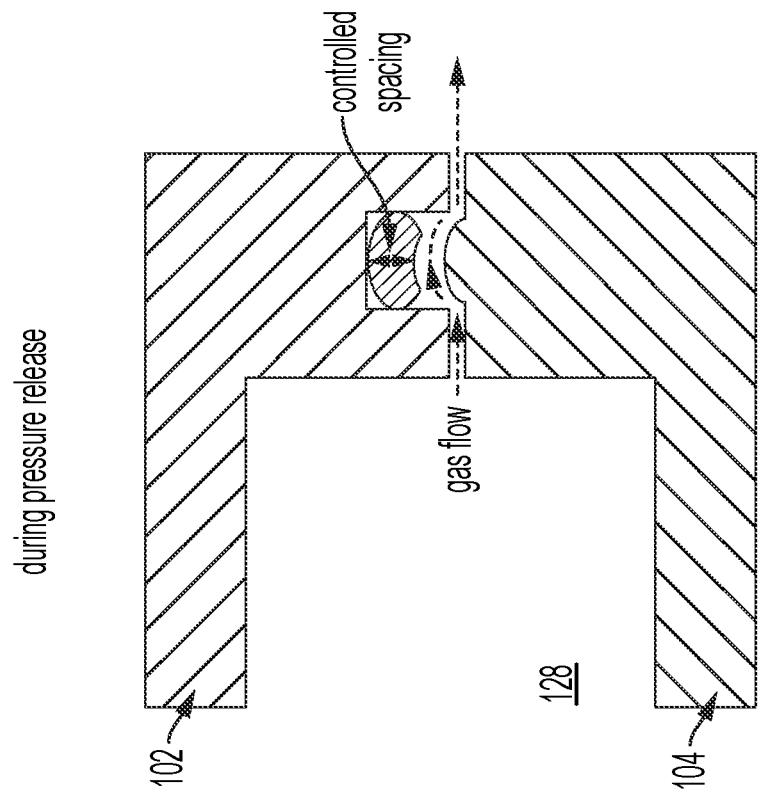
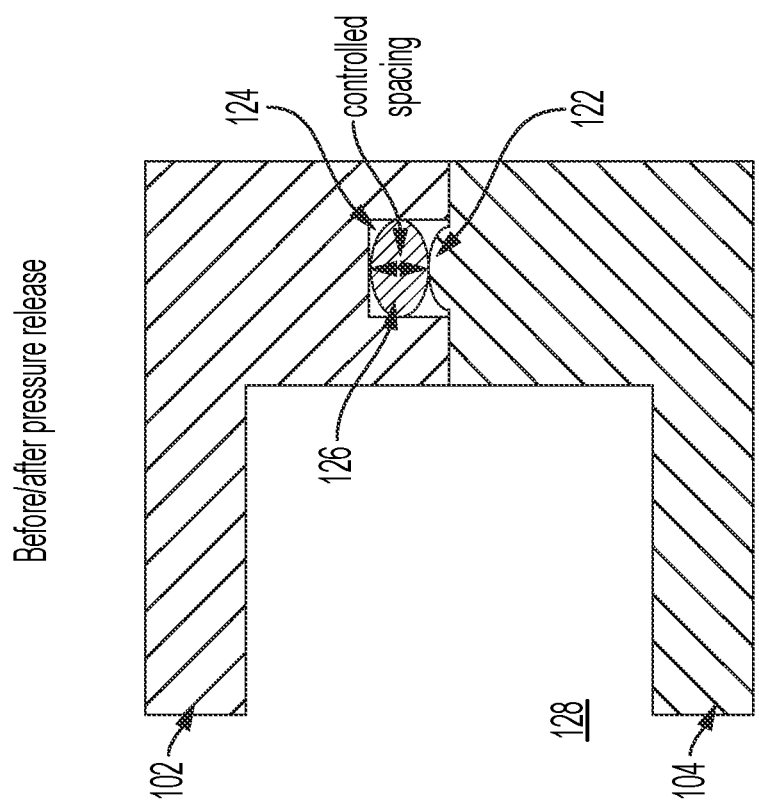
Figure 27B
Figure 27A

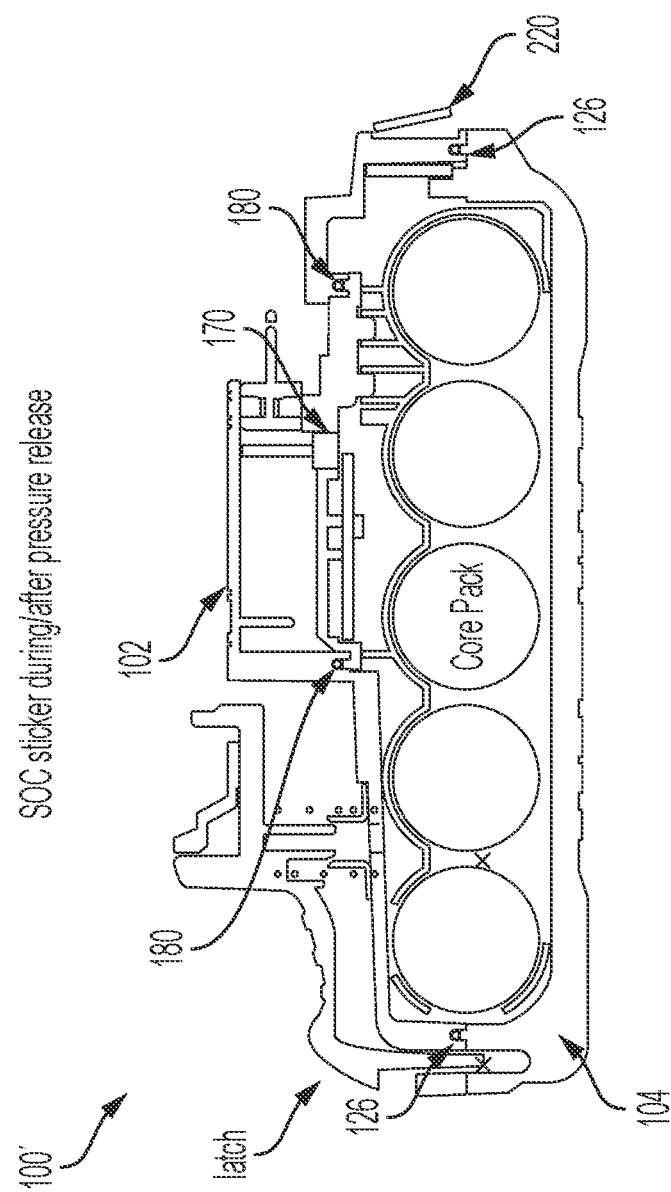

Pressure release element during pressure release

Pressure release element before/after pressure release

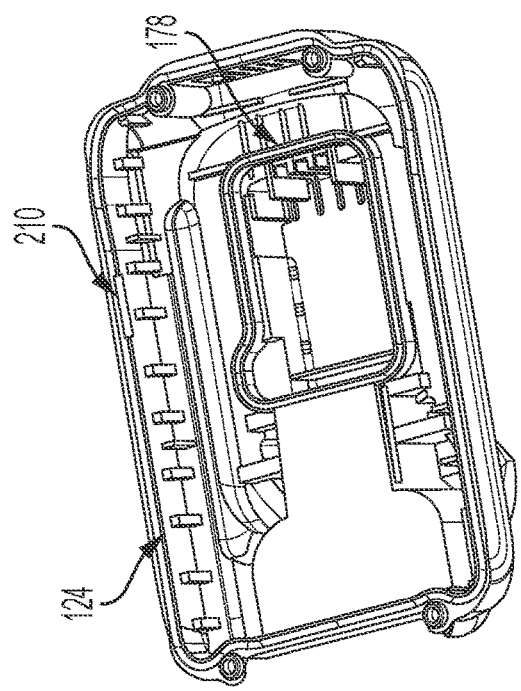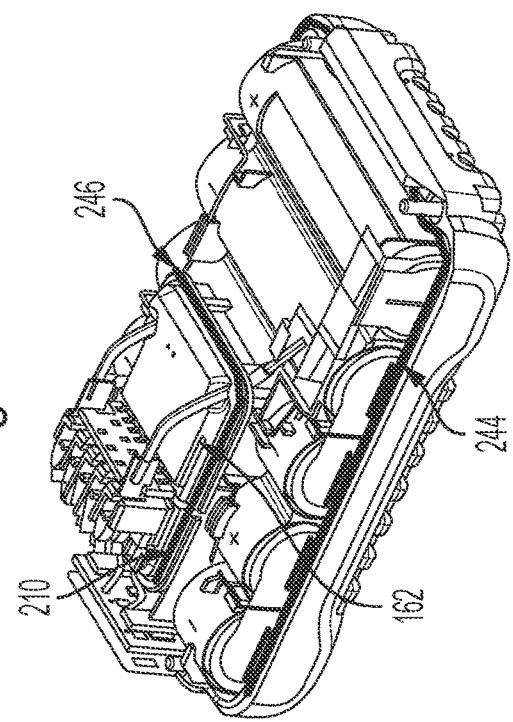

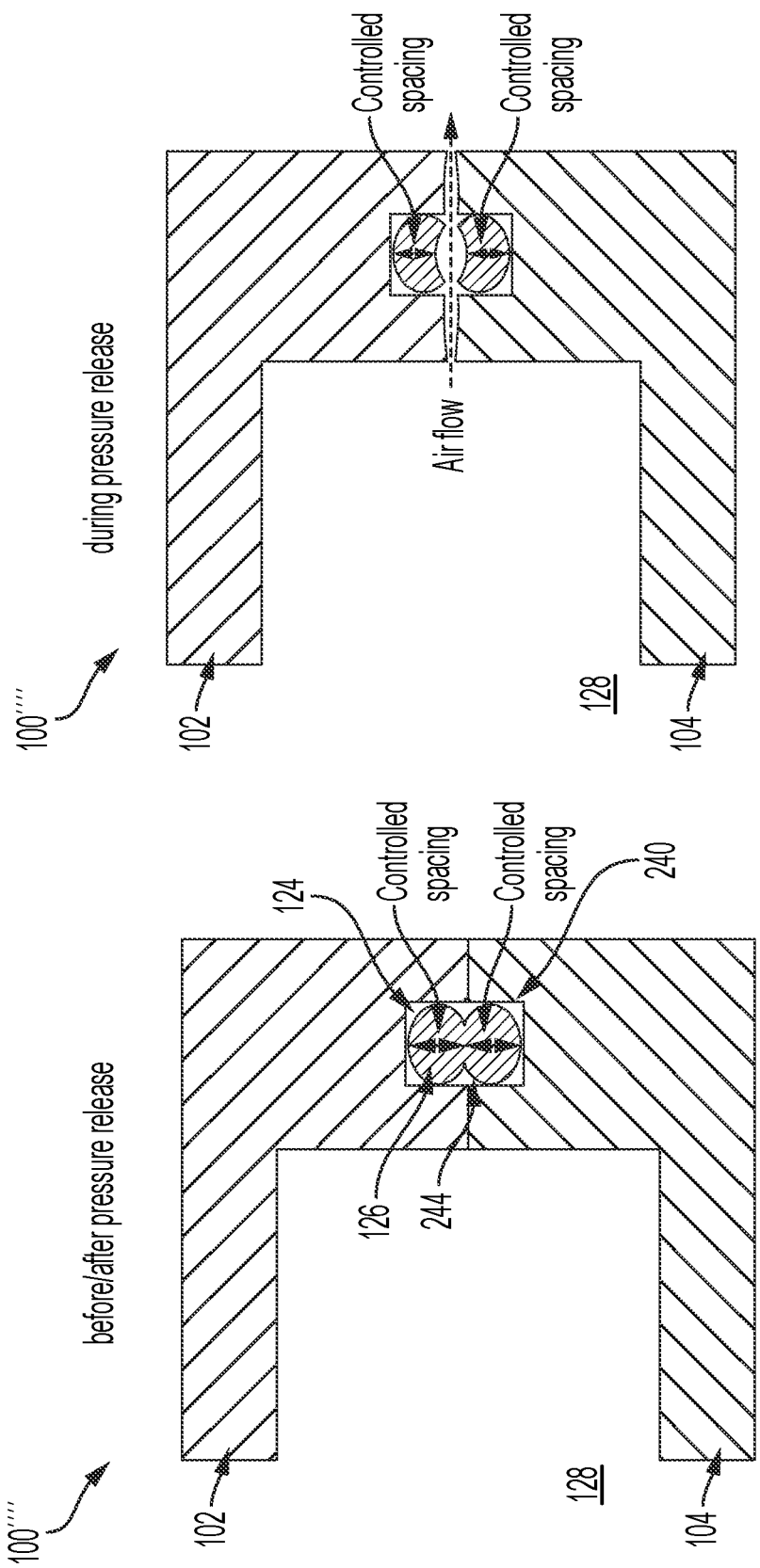

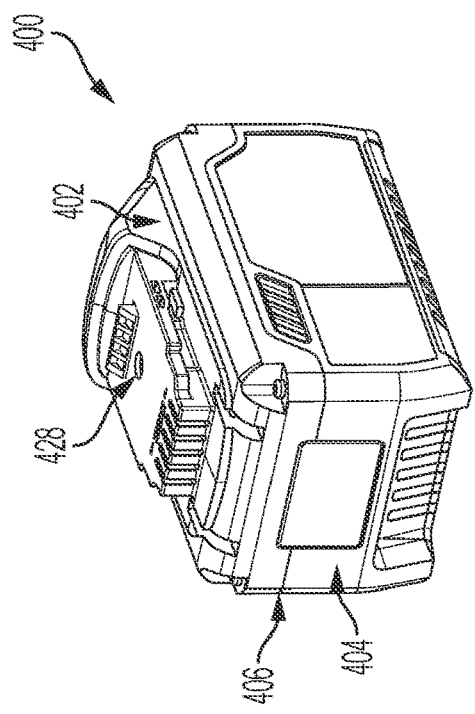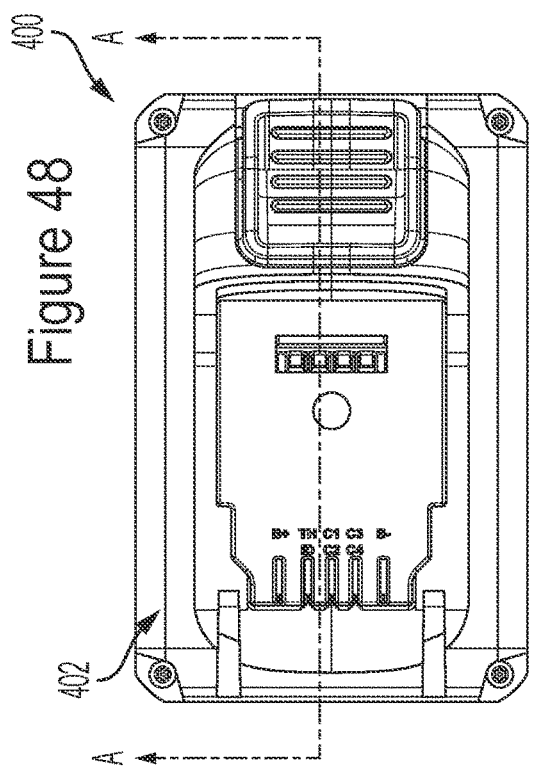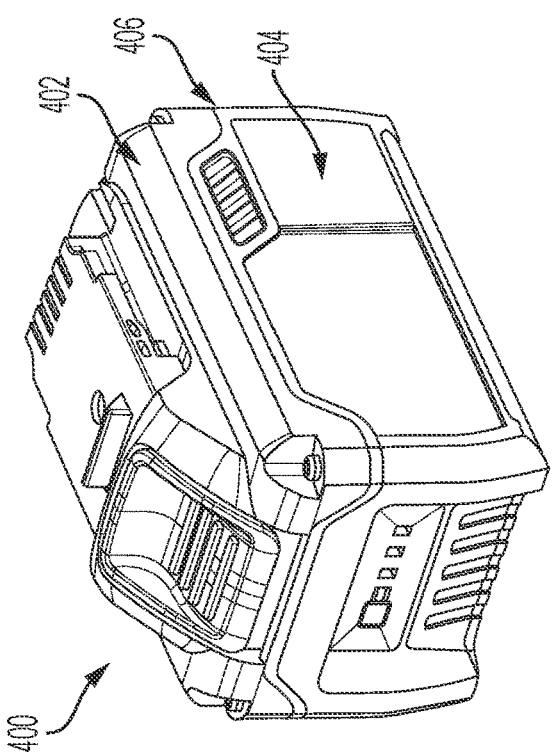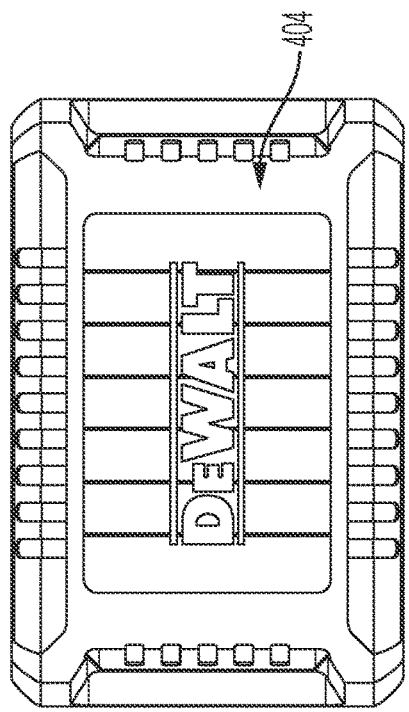
Figure 47
Figure 48
Figure 49
Figure 50

BATTERY PACK

TECHNICAL FIELD

This application relates to a battery pack and method for manufacturing a battery pack. In one implementation, the battery pack includes a battery pack housing, a set of battery cells and a plurality of electrical and electronic components and features for sealing the battery pack housing to prevent water and/or other contaminates from reaching the set of battery cells and the plurality of electrical and electronic components.

BACKGROUND

Removable, rechargeable battery packs are commonly used to power cordless power tools such as construction tools, e.g. drills, circular saws and reciprocating saws and landscaping tools, e.g. string trimmers, hedge trimmers and chain saws. These uses typically result in the battery packs being exposed to various environmental situations. Particularly, the battery packs are exposed to rain, snow and dust. As is well known, rain, snow and dust can have a deleterious effect on the battery packs, particularly the battery cells and the electronic components of the battery packs.

Prior art battery packs have been designed to redirect water and dust and otherwise prevent the water and dust from impacting the cells and the electronics. One battery pack has included a discrete component added to the battery pack to create a separate housing for the latch. This component assists in keeping water from entering the cell cavity. However, because the component must be attached to the housing, in this instance by a screw through the component, the latch receptacle is not truly sealed from the cell cavity. Furthermore, this pack does not address other paths of ingress for water and as such, does not truly seal the battery cells and electronics from water.

The present invention provides a battery pack that is fully seals the battery cell cavity and the battery electronics from water.

SUMMARY

An aspect of the present invention includes sealed battery pack. The battery pack includes various features to create a sealed core pack cavity holding the battery cells and various battery pack electronics. The features include a first O-ring at a mating/parting interface between an upper housing and a lower housing, a sealing plate and a second O-ring at an interface between the upper housing and the sealing plate and an integral cavity for receiving a latch.

Advantages may include one or more of the following: preventing water and other contaminants from reaching the battery cells and/or battery pack electronics.

These and other advantages and features will be apparent from the description and the drawings.

BRIEF DESCRIPTION OF THE DRAWINGS

FIG. 4 is a right side elevation view of the battery pack of FIG. 1.

FIG. 5 is a left side elevation view of the battery pack of FIG. 1.

FIG. 6 is a top plan view of the battery pack of FIG. 1.

FIG. 7 is a front elevation view of the battery pack of FIG. 1.

FIG. 8 is a rear elevation view of the battery pack of FIG. 1.

FIG. 9 is a bottom plan view of the battery pack of FIG. 1.

FIG. 26 is a left side elevation view of the assembly of FIG. 19 and the upper housing of FIG. 25 after assembly of the upper housing and the O-rings prior to assembly.

FIGS. 27A and 27B are section views taken along line B-B of the battery pack of FIG. 6 before and after a pressure release.

FIG. 28 is a section view taken along line A-A of the battery pack of FIG. 6 during and after a pressure release

FIG. 32 is a front, left side isometric interior view of an alternate embodiment of the upper housing of the battery pack of FIG. 1.

FIG. 33 is a front, left side isometric view of an alternate embodiment of the lower housing of the battery pack of FIG. 1.

FIGS. 34A and 34B are section views taken along line B-B of the battery pack of FIG. 6 in the embodiment of FIG. 33 before and after a pressure release.

FIG. 46 is an isometric view of a terminal block subassembly of the battery pack of

FIG. 35.

FIG. 47 is a front, right side isometric view of a third exemplary embodiment of a battery pack of the instant application.

FIG. 48 is a rear, left side isometric view of the battery pack of FIG. 47.

FIG. 49 is a bottom plan view of the battery pack of FIG. 47.

FIG. 50 is a top plan view of the battery pack of FIG. 47.

DETAILED DESCRIPTION

Figure 2:
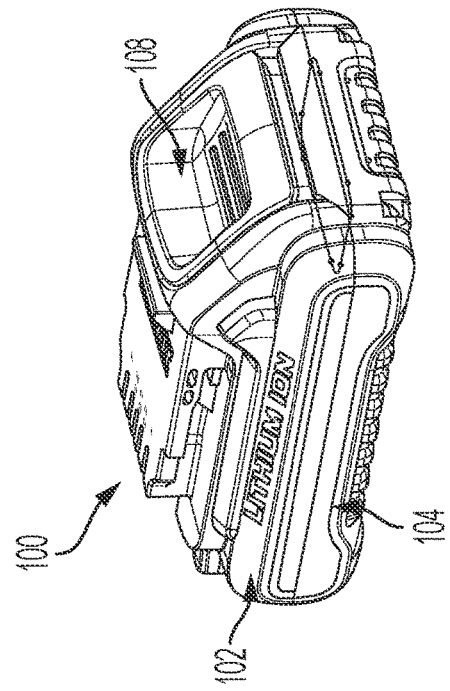
FIG. 2 is a front, left side isometric view of the battery pack of FIG. 1.
Figure 3:
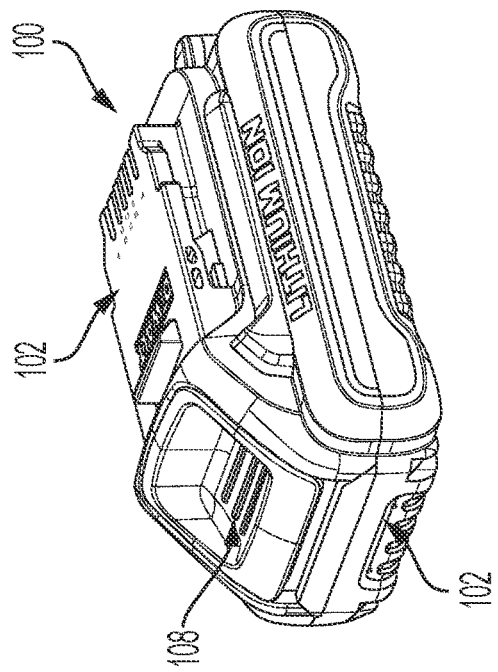
FIG. 3 is a front, right side isometric view of the battery pack of FIG. 1.
Figure 1:
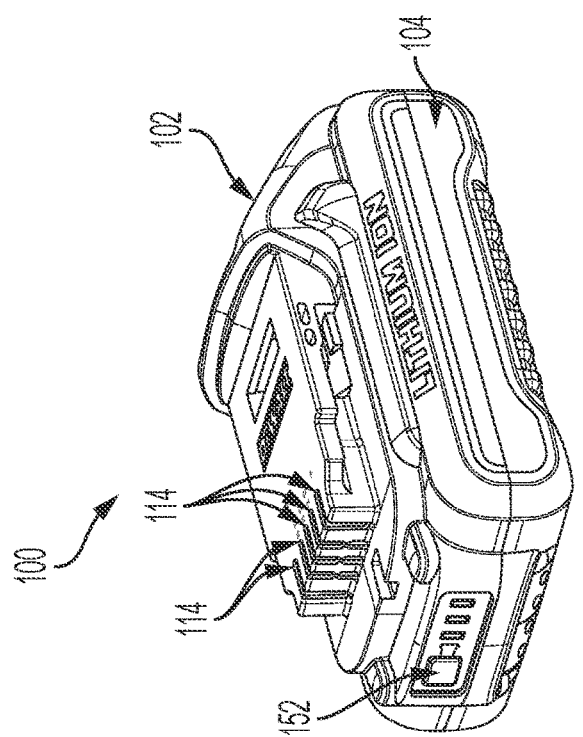
FIG. 1 is a rear, left side isometric view of a first exemplary embodiment of a battery pack of the instant application.

Referring to FIGS. 1-9, there is illustrated a first exemplary embodiment of a sealed battery pack 100. The battery pack 100 includes an upper housing 102 and a lower housing 104. The upper and lower housings 102, 104 are assembled together at a mating or parting line 106. The battery pack 100 also includes a latch 108. The latch 108 enables the battery pack 100 to be coupled to and decoupled from an associated power tool, as is well known in the industry. The latch 108 includes a user operable feature, referred to as a button 110 and a hook 112 that mates with a corresponding catch of the power tool. The upper housing 102 includes a space to hold the latch 108. The upper housing 102 also includes an opening for allowing the hook 112 to move into and out of the battery pack 100 for coupling and decoupling to the power tool.

The upper housing 102 also includes a plurality of terminal slots 114. The battery pack 100 includes a plurality of terminals 116 that are coupled to a set of battery cells 118. The set of terminals 116 include a subset of power terminals 116a and a subset of signal terminals 116b. The power terminals 116a enable power to be drawn from the battery cells 118 to drive the power tool and to be supplied to the battery cells 118 from a charger to charge the battery cells 118. The signal terminals 116b provide information to the power tool and/or charger regarding various characteristics of the battery cells 118. The terminals slots 114 allow for corresponding terminals of the power tool and charger to enter the battery housing 102/104 and mate with the battery terminals 116.

Conventionally, the parting line 106, the space to hold the latch 108 and the opening for the hook 112, and the terminal slots 114 present openings to the battery housing 102/104 for water, dust or other contaminants to enter the battery pack 100 and access the battery cells 118 and/or the battery electronics 120. This can have serious deleterious effects on the battery cells 118 and/or the battery electronics 120.

To this end, the present invention provides solutions to prevent water from entering the battery pack 100 at these three locations.

First, the battery pack 100 includes a tongue and groove configuration and an O-ring between the tongue and groove at the parting line. Second, the battery pack includes a plurality of walls formed integrally with the housing to create cavity that is completely sealed from the cavity that holds the battery cells and the battery electronics. Third, the battery pack includes a sealing plate and a tongue and groove configuration between the sealing plate and the upper housing to seal the cavity that holds the battery cells and the battery electronics from the terminal slots 114. Alternatively, the battery pack includes sealants (or sealing materials) to seal the cavity that holds the battery cells and the battery electronics from the terminal slots 114.

As noted above, the battery pack includes an upper housing and a lower housing. Each of the housings is formed using an injection molding process as is well know in the industry. The upper and lower housings 102, 104 are assembled together to form the battery pack housing. The upper and lower housings 102, 104 are typically held together using a plurality of fasteners, such as screws. The upper and lower housing 102, 104 meet at the parting/mating line 106. Each of the upper and lower housings 102, 104 include a surface that mates with the corresponding surface of the other housing.

Figure 19:
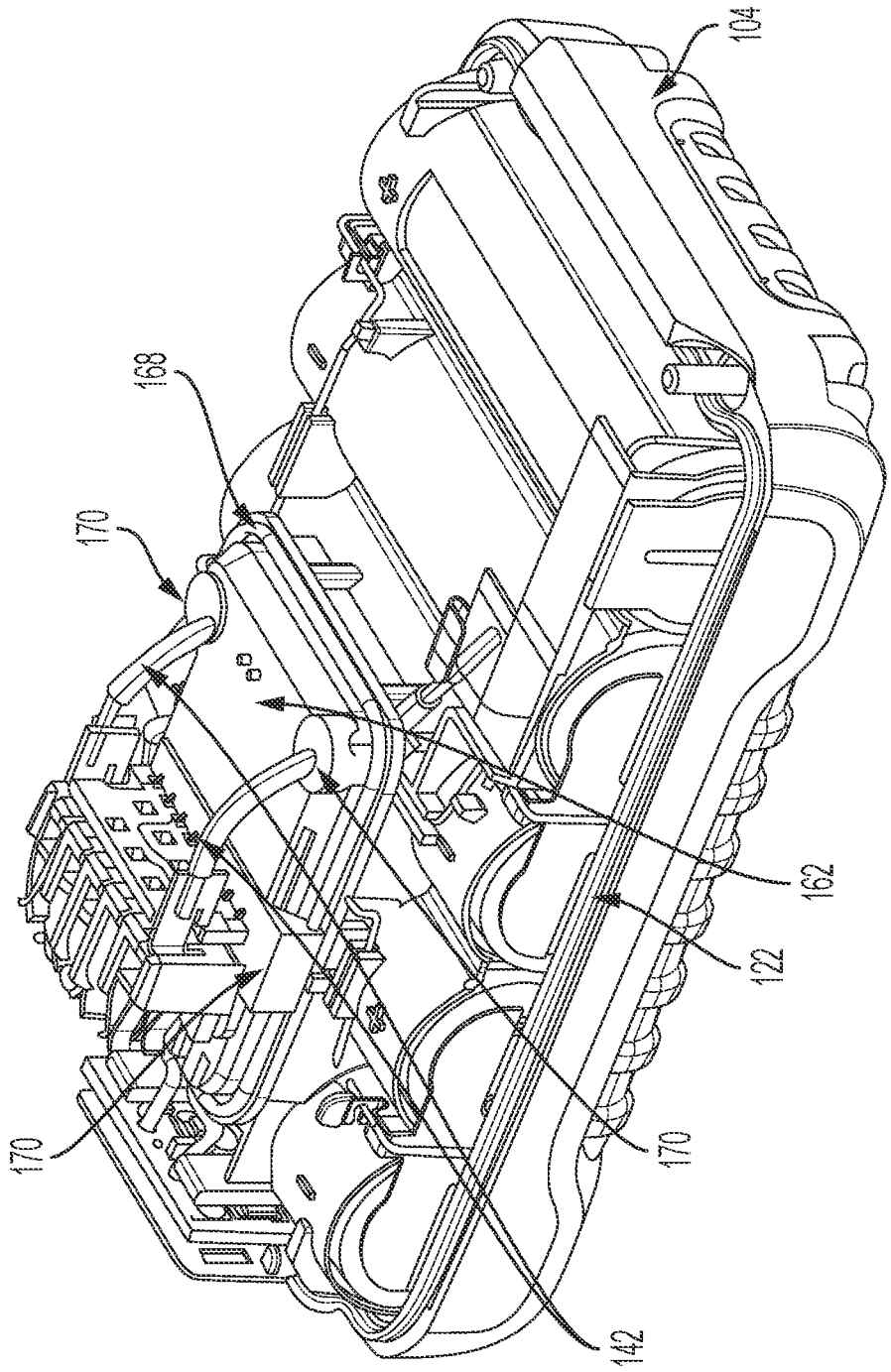
FIG. 19 is an isometric view of the assembly of FIG. 18 and the lower housing of the battery pack of FIG. 1 after assembly.
Figure 20:
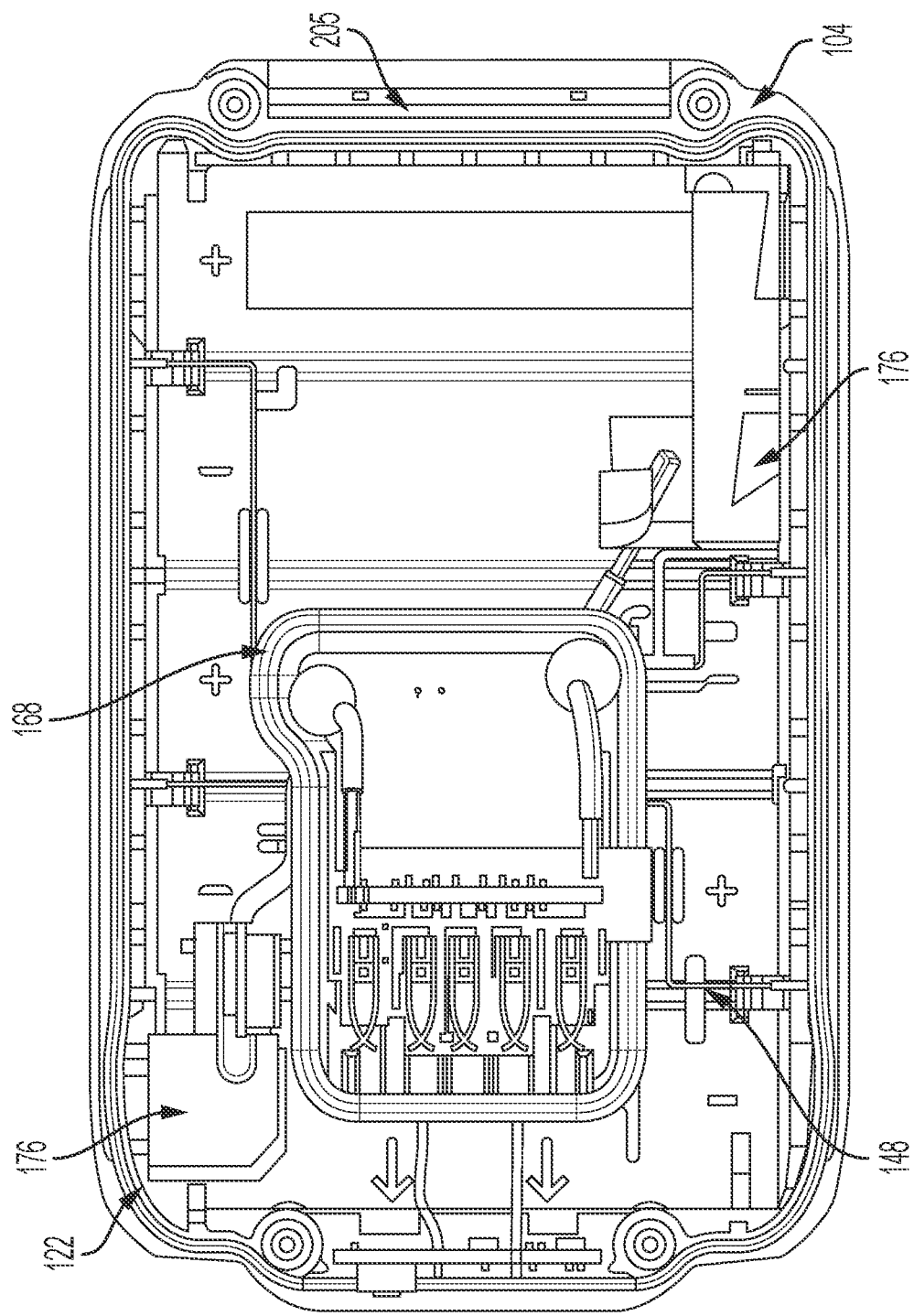
FIG. 20 is a top view of the assembly of FIG. 18 and the lower housing of the battery pack of FIG. 1 after assembly.
Figure 24:
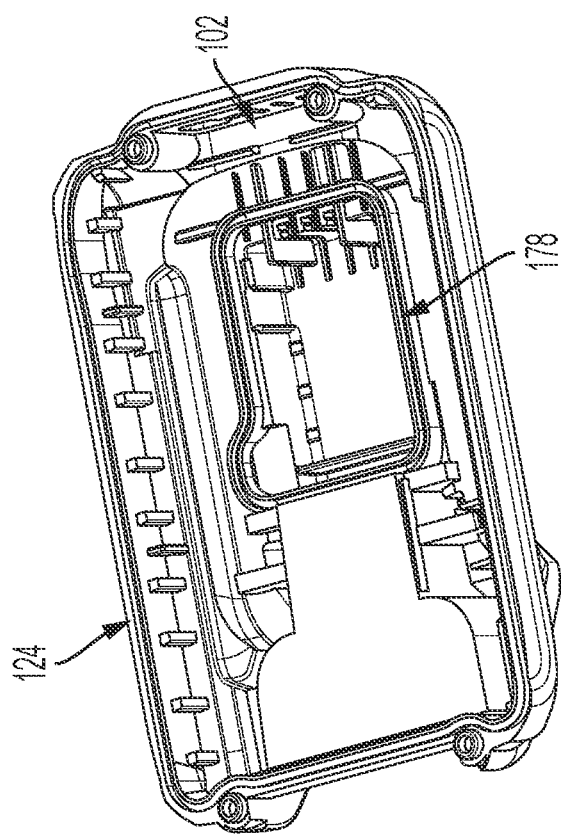
FIG. 24 is a front, left side isometric interior view of the upper housing of FIG. 21.
Figure 30:
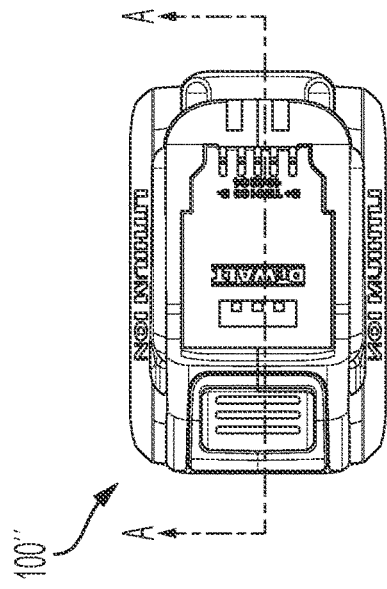
FIG. 30 is a top view of the battery pack of FIG. 29.
Figure 29:
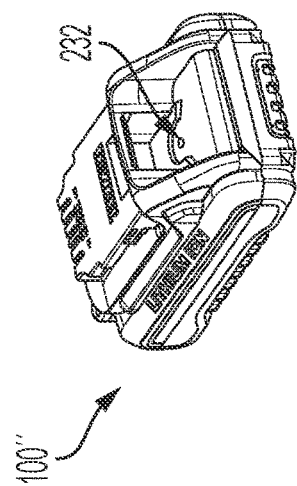
FIG. 29 is a front, left side isometric view of an alternate embodiment of the battery pack of FIG. 1.

As illustrated in FIGS. 19, 20, and 24, the lower housing 104—formed during the injection molding process—includes a first tongue 122 and the upper housing 102—formed during the injection molding process—includes a first groove 124. As will be explained in more detail below, during the assembly process of the battery pack 100 a first O-ring 126 is placed in the first groove 124. The upper housing 102 and the lower housing 104 are then assembled. As illustrated in FIG. 27A, when the upper housing 102 and the lower housing 104 are assembled, a seal is created at the parting line 106 between a core pack cavity 128 and the air outside the battery pack 100. Fasteners, such as screws, are used to hold the lower housing 104 and upper housing 102 together and maintain the seal.

As noted above, contaminants particularly water may enter the battery housing 102/104 through the terminal slots 114. The water moves into a space adjacent to the pack electronics 120, particularly a battery pack printed circuit board. In order to protect the PCB and electronics, the battery pack 100 includes a sealing plate 162 to seal the core pack cavity 128 (also referred to generally as a sealed cavity) in the space where water would enter the battery pack 100 through the terminal slots 114.

Figure 10:
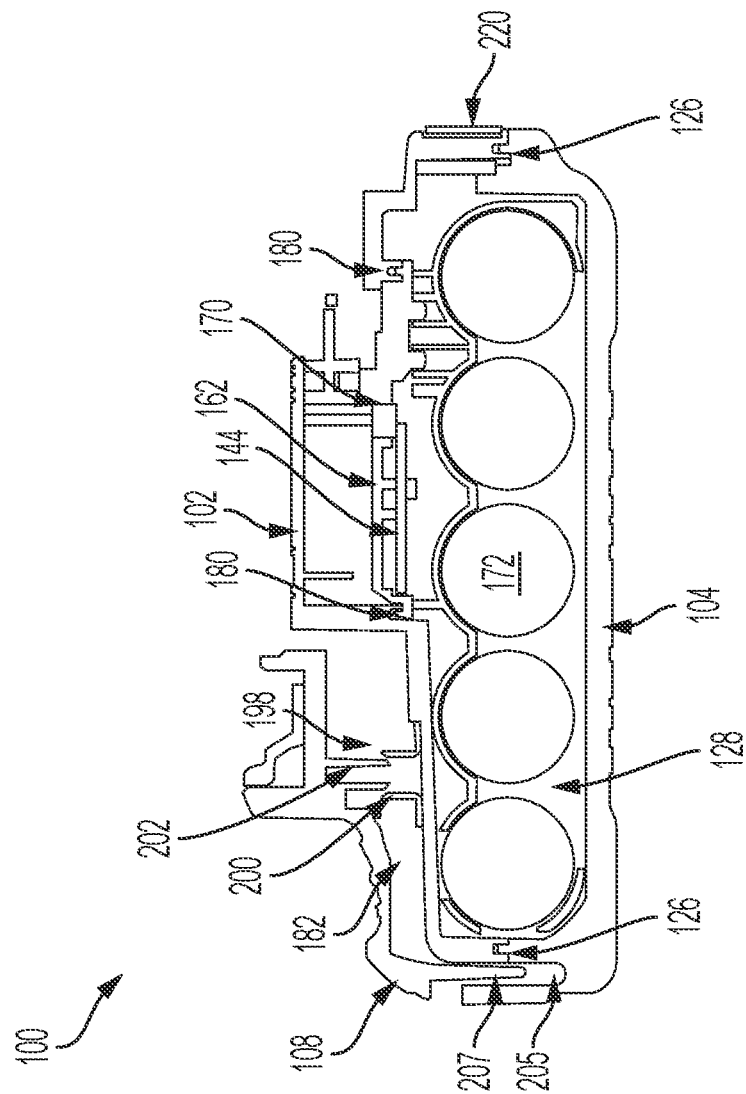
FIG. 10 is a section view taken along line A-A of the battery pack of FIG. 6.
Figure 12:
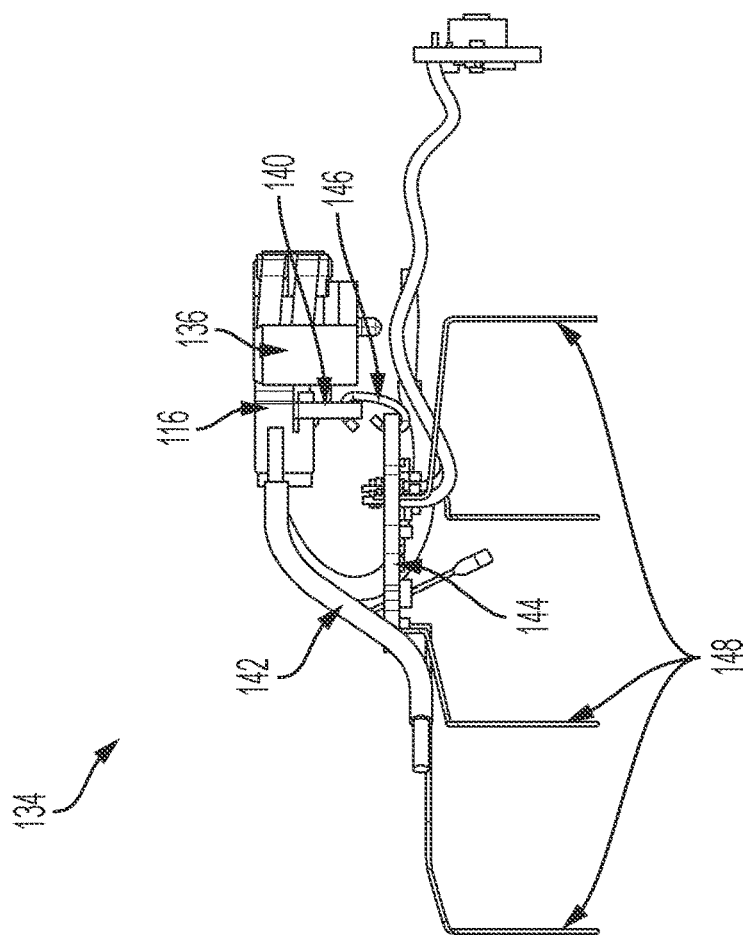
FIG. 12 is a side view of the component subassembly of FIG. 11.
Figure 11:
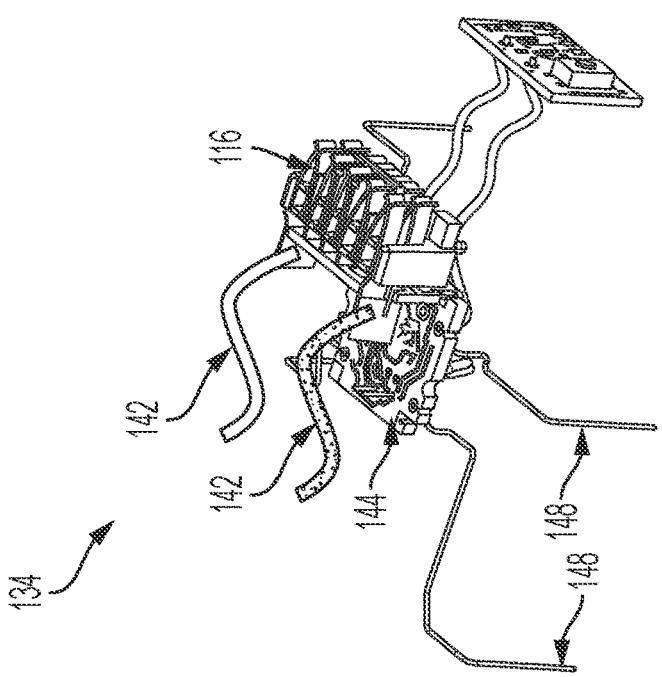
FIG. 11 is an isometric of a component subassembly of the battery pack of FIG. 1.

As illustrated in FIGS. 10-20, the battery pack 100 includes an electronics subassembly 134 as shown in FIGS. 11 and 12. The electronics subassembly 134 includes a set of terminals 116 held in a terminal housing 136 together forming a terminal block 138. A terminal printed circuit board (PCB) 140 is attached to a rear side of the terminal housing 136. The plurality of terminals 116 are connected to the terminal PCB 140. The electronics subassembly 134 also includes a pair of power lines 142 (wires). One of the power lines 142 is connected to a positive (+) power terminal 116a1 and one of the power lines is connected to a negative (−) power terminal 116a2. The terminal PCB 140 is connected to a main PCB 144 by a plurality of connection wires 146. The connection wires 146 are connected to the plurality of terminals 116 by traces on the terminal PCB 140. The electronics subassembly 134 also includes a plurality of sense wires 148. At one end, the sense wires 148 are connected to the main PCB 144 and at another end the sense wires 148 will be connected to intra-cell battery straps 150 to provide intra-cell voltages to the main PCB 144 and the signal terminals 116b. The sense wires 148 are connected to the connection wires 146 by traces on the main PCB 144. The electronics subassembly 134 also includes a state of charge (SOC) indicator 152. The SOC indicator 152 includes an SOC PCB 154, an activation button 156, a plurality of LEDs 158 and other components. The SOC PCB 154 is connected to the main PCB 144 by a pair of wires 160.

Figure 13:
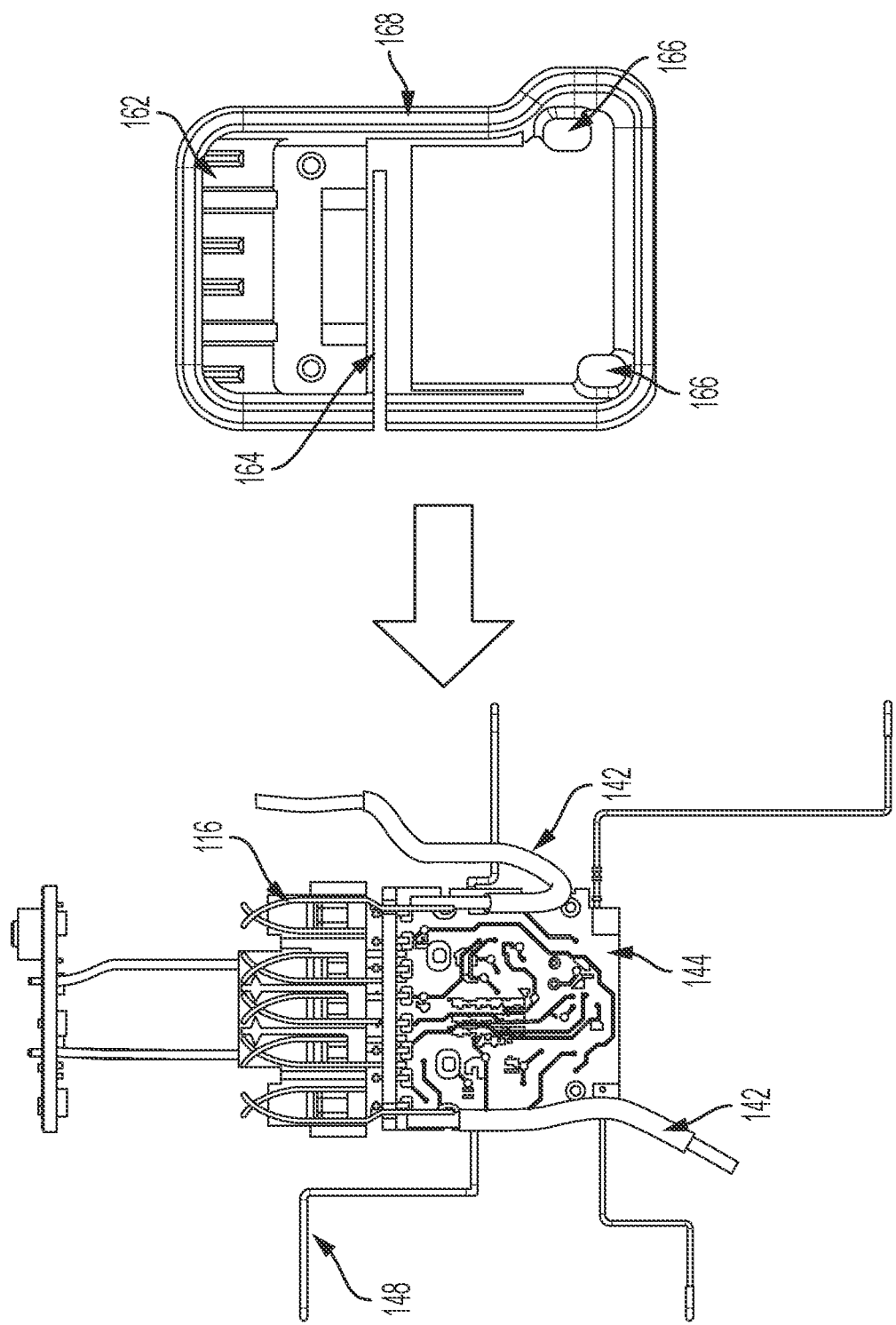
FIG. 13 is a top view of the component subassembly of FIG. 11 and a sealing component of the instant application prior to assembly.
Figure 14:
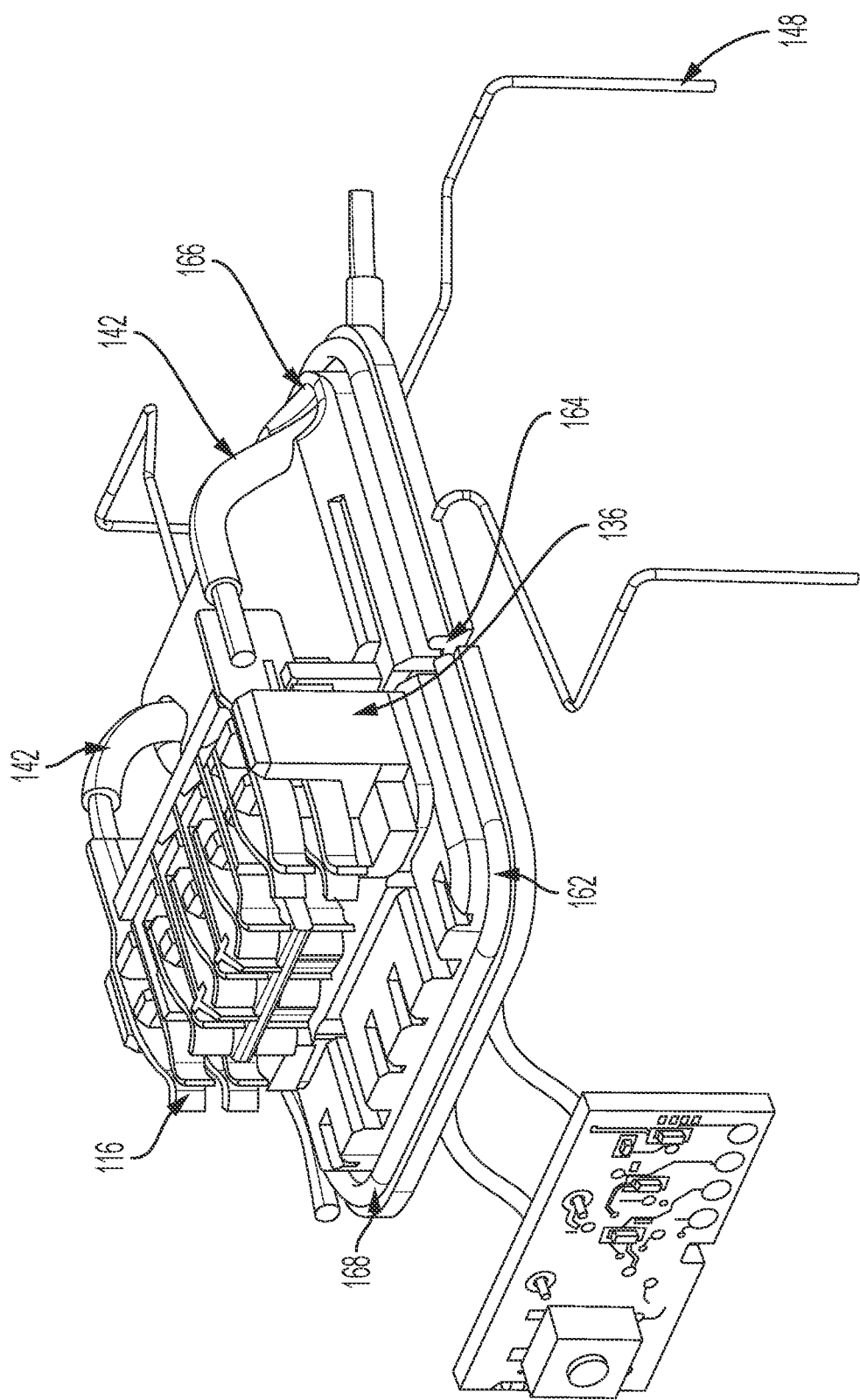
FIG. 14 is an isometric of the component subassembly and sealing component of FIG. 13 after assembly.

As illustrated in FIG. 13, the battery pack includes a sealing plate 162. The sealing plate 162 is created through an injection molding process. The sealing plate 162 may be made of the same material as the upper and lower housings 102, 104. The sealing plate 162 includes a sealing plate channel 164. The sealing plate channel 164 allows the sealing plate 162 to be assembled with the electronics subassembly 134. The sealing plate channel 164 receives the connection wires 146 when the sealing plate 162 is combined with the electronics subassembly 134, as indicated by the arrow. The sealing plate 162 also includes a pair of sealing plate holes 166. The sealing plate holes 166 allow for the power wires 142 to be threaded through the sealing plate 162. The sealing plate 162 is also formed/configured with a second tongue 168 along a perimeter of the sealing plate 162. As illustrated in FIGS. 13 and 14, the sealing plate 162 is slide onto/over the main PCB 144 such that the connection wires 146 are positioned in the sealing plate channel 164 when complete and the power lines 142 are threaded through the sealing plate holes 166.

Figure 15:
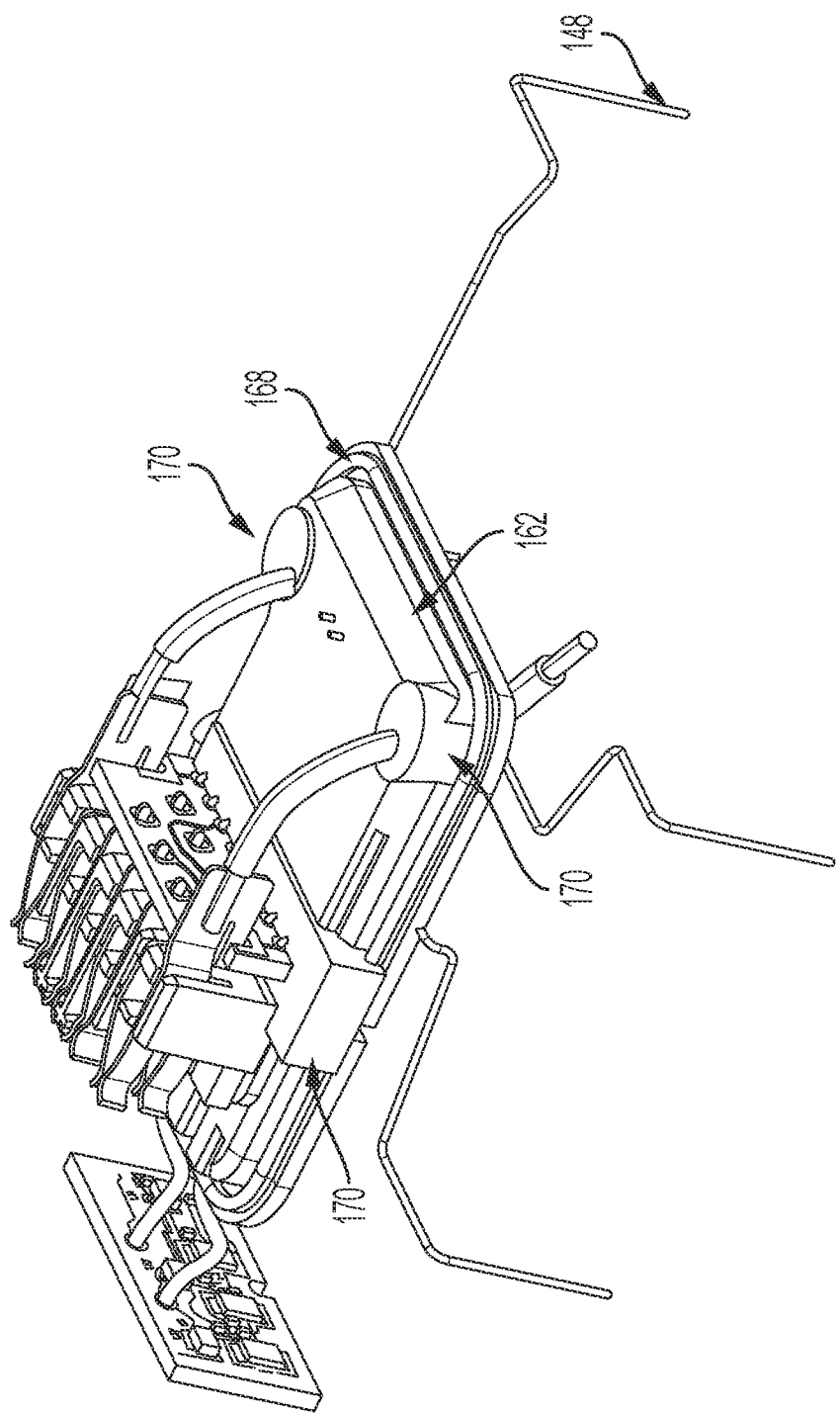
FIG. 15 is an isometric view of the component subassembly and sealing component of FIG. 14 after application of a sealant.

As illustrated in FIG. 15, after the sealing plate 162 is installed onto the electronics subassembly 134, a sealant 170 such as RTV is applied to the sealing plate channel 164 and the sealing plate holes 166. This provides a solid sealing plate 162 (which will serve to create a seal between the housing terminals slots 114 and the core pack cavity 128.

Figure 16:
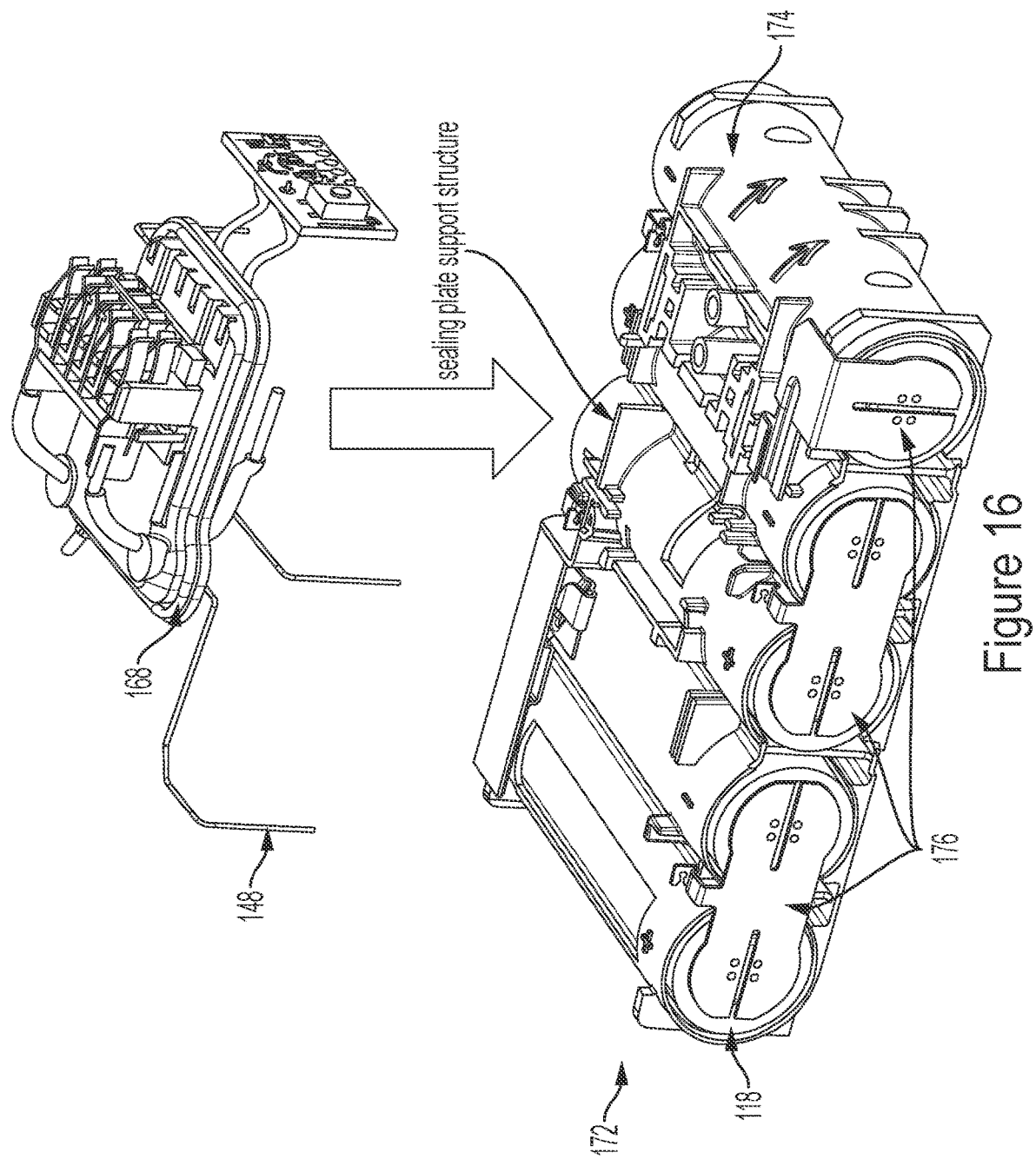
FIG. 16 is an isometric view of the component subassembly and sealing component of FIG. 15 and a core pack of the battery pack of FIG. 1 prior to assembly.

As illustrated in FIG. 16, after the sealant 170 is applied to the sealing plate 162, the combination of the electronics subassembly 134 and sealing plate 162 is assembled onto the core pack 172. The core pack 172 includes at least a plurality of battery cells 118, a battery cell holder 174 and a plurality of battery straps 176.

Figure 18:
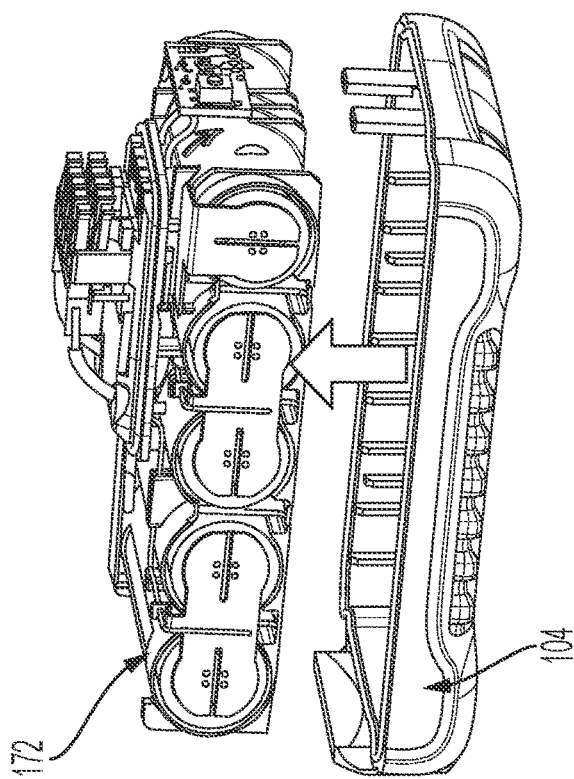
FIG. 18 is an isometric view of the assembly of FIG. 17 and a lower housing of the battery pack of FIG. 1 prior to assembly.
Figure 17:
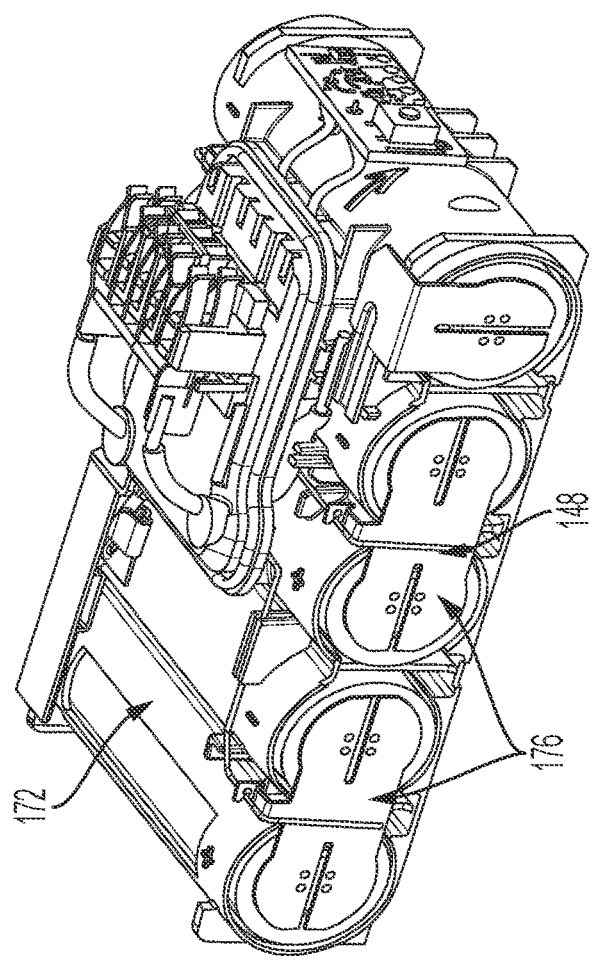
FIG. 17 is an isometric of the component subassembly, sealing component and core pack of FIG. 16 after assembly.

FIG. 17 illustrates the electronics subassembly 134 and sealing plate 162 assembled onto the core pack 172. The sense lines 148 are connected to intra-cell battery straps 176b (by welding or soldering or other fixing method) and the power lines 142 are connected to the power battery straps 176a. As illustrated in FIG. 18, the core pack 172, electronics subassembly 134 and sealing plate 162 are assembled with the lower housing 104. FIGS. 19 and 20 illustrate the core pack 172, electronics subassembly 134 and sealing plate 162 assembled with the lower housing 104.

Figure 25:
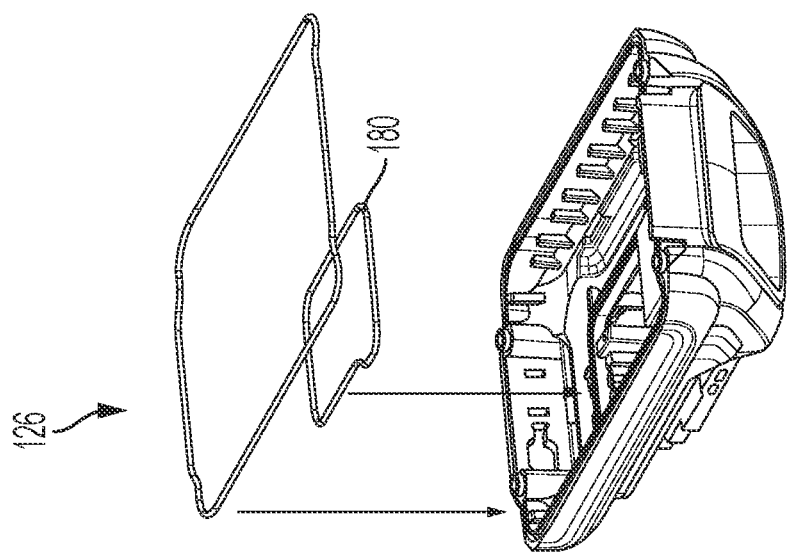
FIG. 25 is a front, right side isometric interior view of the upper housing of FIG. 21 and a pair of O-rings prior to assembly.

As illustrated in FIGS. 24 and 25, the upper housing 102 is formed with a second groove 178 and a second O-ring 180 is assembled into the second groove 178. As such, when the upper housing 102 is assembled with the lower housing 104 as illustrated in FIG. 26 and the upper housing 102 is fastened to the lower housing 104, a seal is formed between the upper housing 102 and the sealing plate 162 by the second O-ring 180 abutting with the second tongue 168. This is similar to the seal that is formed between the upper housing 102 and the lower housing 104 by the first O-ring 126 and the first tongue 124, illustrated in FIG. 27A.

Alternatively, the first and second grooves 124, 178 could be formed on the lower housing 104 and the sealing plate 162, respectively and the first and second tongues 122, 168 could be formed on the upper housing 102 with the first and second O-rings 126, 180 being assembled into the first and second grooves 124, 178.

Figure 21:
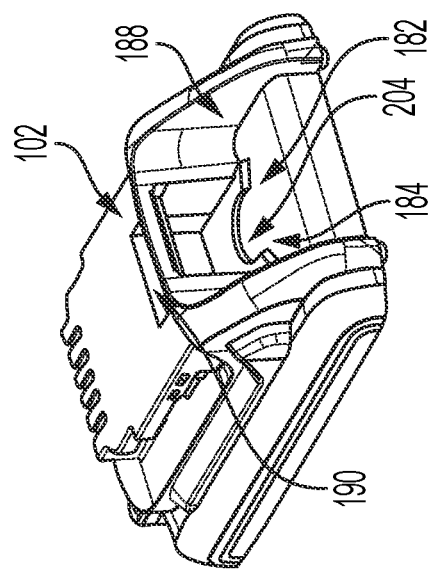
FIG. 21 is a front, left side isometric view of an upper housing of the battery pack of FIG. 1.

As noted above, in conventional battery packs, contaminants, particularly water may enter the battery housing and the core pack cavity through a latch opening in the upper housing 102. The battery pack of the instant application includes a latch receiving cavity/volume 182. The latch receiving cavity 182 is created by a plurality of walls integrally formed in the upper housing 102. The plurality of latch receiving cavity walls are formed during the injection molding process of the upper housing 102. As illustrated in FIGS. 10 and 21, the upper housing 102 includes a first (bottom) wall 184, a second (side) wall 186, a third (side) wall 188, and fourth (rear) wall 190. The second, third and fourth walls 186, 188, 190 meet the bottom wall 186. Together these four walls define a cavity/volume 182 in which the latch 108 is received. As these walls are formed integrally with each other and the upper housing 102, the cavity/volume 182 formed by these walls is sealed from the core pack cavity 128. This seal prevents water (and other contaminants) that enters the latch cavity/volume 182 from entering the core pack cavity 128. As such, the battery cells 118 will not be negatively affected by such water (and other contaminants).

The foregoing describes the various features included in the battery pack 100 to seal the core pack cavity 128 and the battery electronics 120 and prevent water (and other contaminants) from negatively affecting the battery cells 118 and the battery electronics 120.

As illustrated in FIG. 10, the battery pack 100 includes an upper housing 102 and a lower housing 104. In order to seal the core pack 172—and the core pack cavity 128 that houses the core pack 172—and the battery pack electronics 170 on a main PCB 144, the battery pack 100 includes a first tongue 122 on the lower housing 104, a first groove 124 on the upper housing 102 and a first O-ring 126 positioned between the first tongue 122 and the first groove 124; a second tongue 168 positioned on the sealing plate 162, a second groove 178 on the upper housing 102 and a second O-ring 180 positioned between the second tongue 168 and the second groove 178; and a latch receiving cavity 182 defined by a plurality of walls integrally formed with the upper housing 102. To properly constrain the latch 108, there is a spring holder 200. The spring holder 200 is concentric with the latch spring constraint 202 and prevents the spring 198 from dislodging during normal operation of the latch 108. The spring holder 200 aids in assembly by holding the spring 198 in place as the latch 108 is slid into position in the latch receiving cavity 182. The upper housing 102 includes the latch receiving cavity/volume/pocket 182 that is sealed off from the internal cavity 128 of the battery pack 100 that holds the core pack 172 (core pack cavity/volume 128). The lower housing 104 includes a latch leg receptacle 205 for receiving a leg 207 of the latch 108 and constraining the latch 108 while not breaking the perimeter created by the O-ring seal.

The following describes the method for manufacturing the sealed battery pack 100. An upper and a lower housing 102, 104 are created by an injection molding process. The lower housing 104 is formed with a first tongue feature 122 along a perimeter 192 of the lower housing 104 at a parting/mating surface 106. FIG. 20 illustrates the first tongue 122. The upper housing 102 is formed with a first groove feature 124 along a perimeter 194 of the upper housing 102 at a parting/mating surface and a second groove feature at an interior surface of the upper housing 102. FIG. 24 illustrates the first and the second grooves 124, 178. As illustrated in FIGS. 11 and 12, an electronics subassembly 134 including a terminal block 138, a main PCB 144, power lines 142, sense lines 148 and an SOC indicator 152 are created.

As illustrated in FIGS. 13 and 14, a sealing plate 162 is assembled with the electronics subassembly 134 by sliding the sealing plate 162 onto the electronics subassembly 134 (particularly sliding a plurality of wires 146 connecting the main PCB 144 with a terminal block PCB 140 along a channel 164 in the sealing plate 162). The power lines 142 are then threaded through holes 166 in the sealing plate 162.

Figure 22:
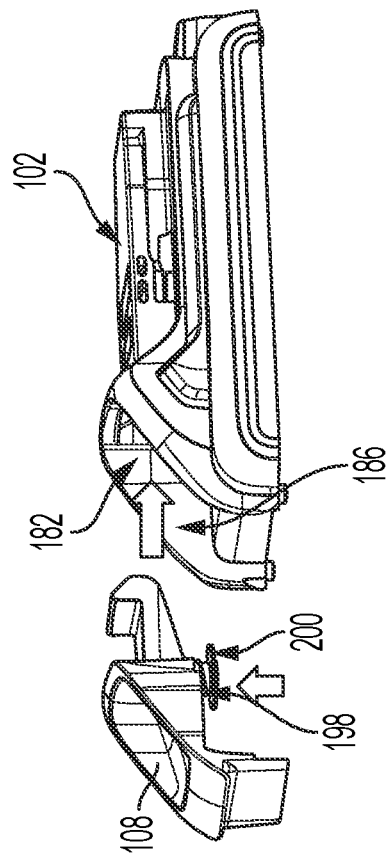
FIG. 22 is a front, right side isometric view of the upper housing of FIG. 21 and a latch subassembly of the battery pack of FIG. 1 prior to assembly.
Figure 23:
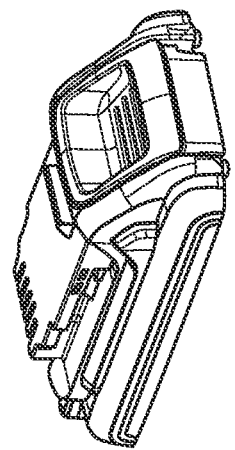
FIG. 23 is a front, left side isometric view of the upper housing and latch subassembly of FIG. 22 after assembly.

A sealant 170, such as RTV, is applied to the sealing plate channel 164 and the sealing plate holes 166. The result of this application is illustrated in FIG. 15. As illustrated in FIG. 16, the sealing plate 162 and electronics subassembly 134 are then assembled with the core pack 172. The result of this assembly is illustrated in FIG. 17. As illustrated in FIG. 18, the sealing plate 162, electronics subassembly 134 and core pack 172 are then assembled with the lower housing 104. The lower housing 104 includes a volume/cavity 128 to receive the core pack 172. The result of this assembly is illustrated in FIGS. 19 and 20. As illustrated in FIG. 22, the latch 108 along with a spring 198 and a spring holder 200 are assembled with the upper housing 102. The spring 198 is placed on the spring holder 200. The spring holder 200 and spring 198 are assembled with the latch 108. The latch 108 includes a latch spring constraint 202, illustrated in FIG. 10, that receives the spring 198. To install the latch 108, latch spring 198 and latch spring holder 200, the spring 198 is compressed with the latch spring holder 200, then the latch 108, latch spring 198 and latch spring holder 202 subassembly is moved into the latch receiving cavity/volume 182. The latch 108 may be slightly rotated clockwise (in the view shown in FIG. 22) to allow the hook 112 to be moved under a bridge connecting the second and third walls 186, 188 defining the latch receiving cavity 182. The latch subassembly is then rotated counterclockwise (in the view shown in FIG. 22) back to the starting orientation and moved towards the terminal slots 114 until the spring holder 200 is positioned in a spring holder recess 204 in the first wall 184 defining the latch receiving cavity 182. The latch 108 is released allowing the spring 198 to force the latch 108 upward (in the view shown in FIG. 22) and position the hook 112 through a hook opening in the upper housing 102. The result of this assembly is illustrated in FIG. 23.

The first O-ring 126 and the second O-ring 180 are then placed in the first groove 124 and the second groove 178, respectively, formed in the upper housing 102, as illustrated in FIG. 25. As illustrated in FIG. 26, the lower housing 104—holding the core pack 172, electronics subassembly 134 and sealing plate 162—is then assembled with the upper housing 102. The upper housing 102 is affixed to the lower housing 104 by the fasteners, such as screws. The result of this assembly is illustrated in FIGS. 1-9.

As a result of this design and manufacture, a sealed cavity (core pack cavity) 128 holding the core pack 172 and battery electronics 134 is created. This sealed cavity 128 is sealed from water that would otherwise enter the battery pack housing through the housing terminal slots 114, around the latch 108 or through the parting/mating line interface 106.

It is well known that when battery cells 118 fail they can vent a gaseous substance. In a sealed cavity such as the core pack cavity 128, the venting of the gaseous substance will cause a pressure build up in the core pack cavity 128. To prevent the battery pack 100 from exploding due to the build up of the gaseous substance, a first exemplary option may be included in the battery pack 100. As illustrated in FIGS. 27A and 27B, the groove 124, tongue 122 and O-ring configuration 126 form part of the seal of the core pack cavity 128. As gas builds up in the core pack cavity 128, it will seek an escape through the interface between the upper housing 102 and the lower housing 104. The O-ring 126 can be designed to have an elasticity to control the spacing between the upper housing 102 and the lower housing 104. The O-ring 126 can be designed such that when the pressure in the core pack cavity 128 reaches a predefined pressure threshold (a pressure less than would cause damage to the battery pack housing), the gas will force the upper housing 102 slightly apart from the lower housing 104 and compress the O-ring 126. This will allow some of the gas in the core pack cavity 128 to escape to outside the battery pack housing. Once the pressure is reduced below the predefined pressure threshold—due to the escape of some gas—the O-ring 126 will expand and the upper housing 102 will reengage the lower housing 104, once again sealing the core pack cavity 128.

In an alternate embodiment, as illustrated in FIG. 28, a the battery pack 100' includes a sticker 220 over the SOC indicator 152, as illustrated in FIG. 10. This sticker 220 serves as part of the seal of the core pack cavity 128 by sealing any openings in the upper housing 102 that might receive the LEDs 158, activation button 156 or other components of the SOC indicator subassembly. The adhesive characteristics of the sticker 220 may be designed such that once the pressure in the core pack cavity 128 reaches a predefined pressure threshold (a pressure less than would cause damage to the battery pack housing), the gas will force the sticker 220 to peel away from the upper housing 102, as illustrated in FIG. 28. Once the sticker 220 peels away from the upper housing 102, the core pack cavity 128 will no longer be sealed.

Figure 31B:
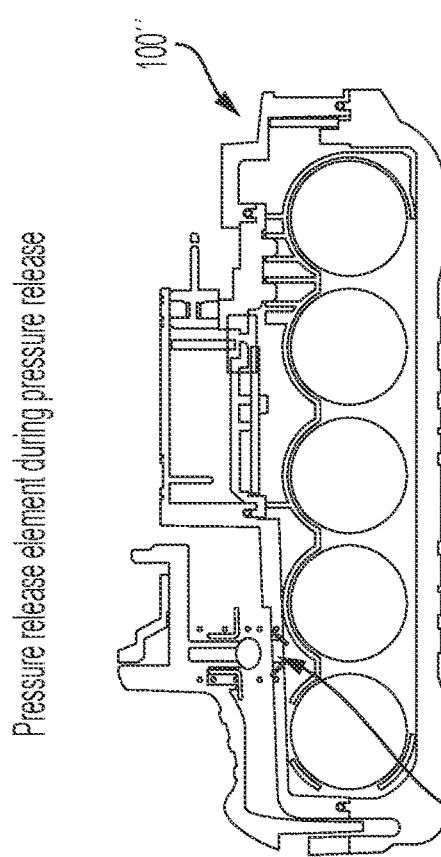
FIGS. 31A and 31B are section views taken along line A-A of the battery pack of FIG. 30 before and after a pressure release.
Figure 31A:
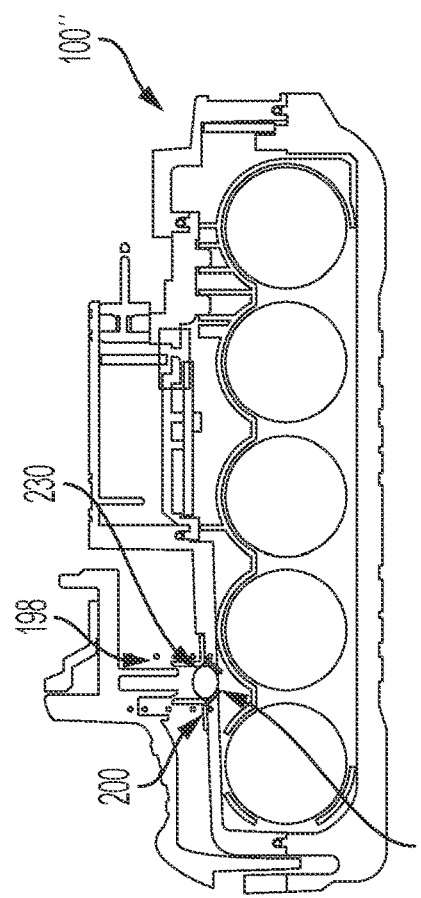
Figure 35:
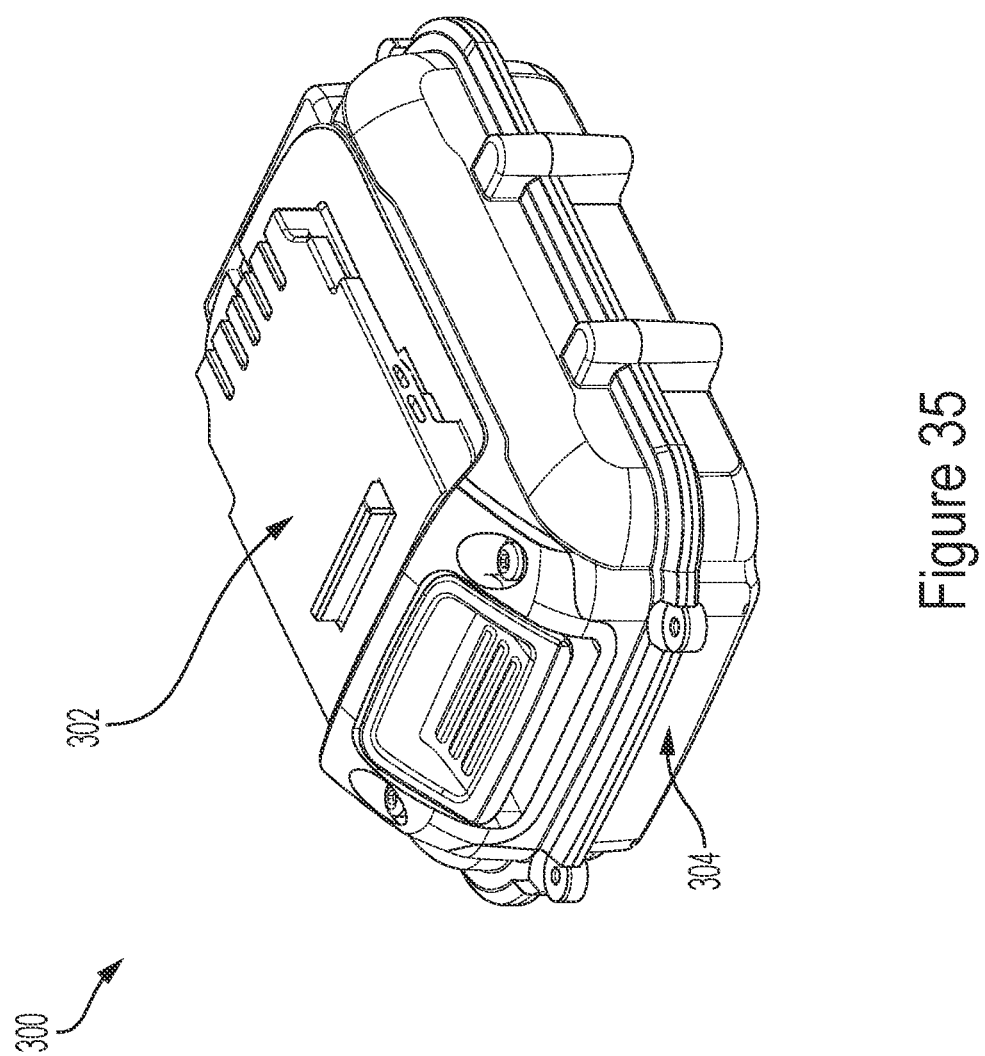
FIG. 35 is a front, right side isometric view of a second exemplary embodiment of a battery pack of the instant application.
Figure 36:
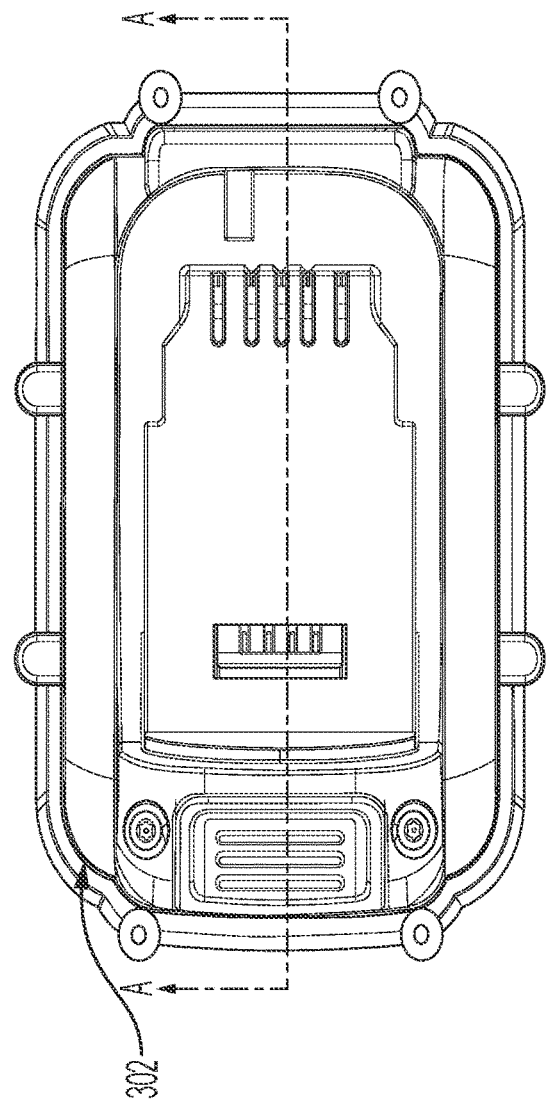
FIG. 36 is a top view of the battery pack of FIG. 35.
Figure 37:
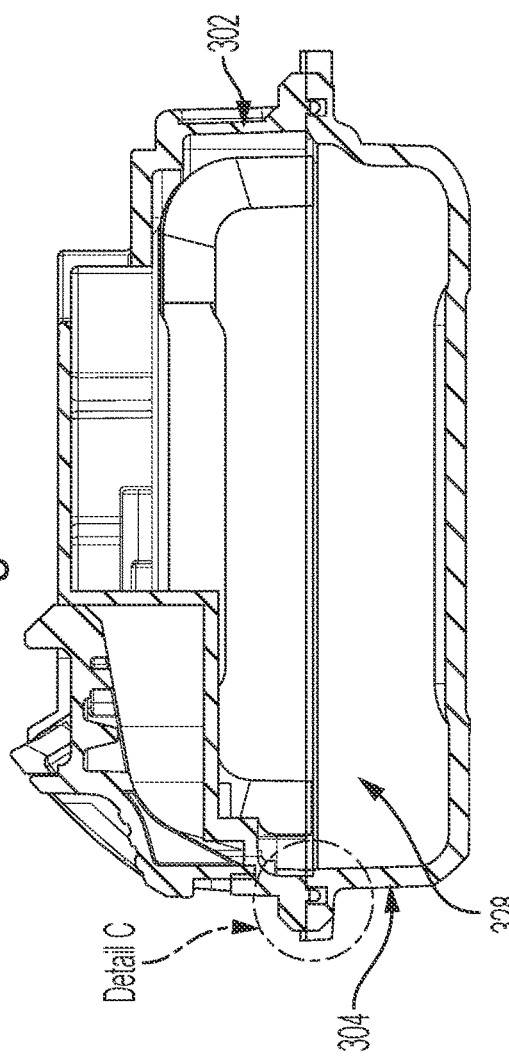
FIG. 37 is a section view along line A-A of the battery pack of FIG. 36.
Figure 39:
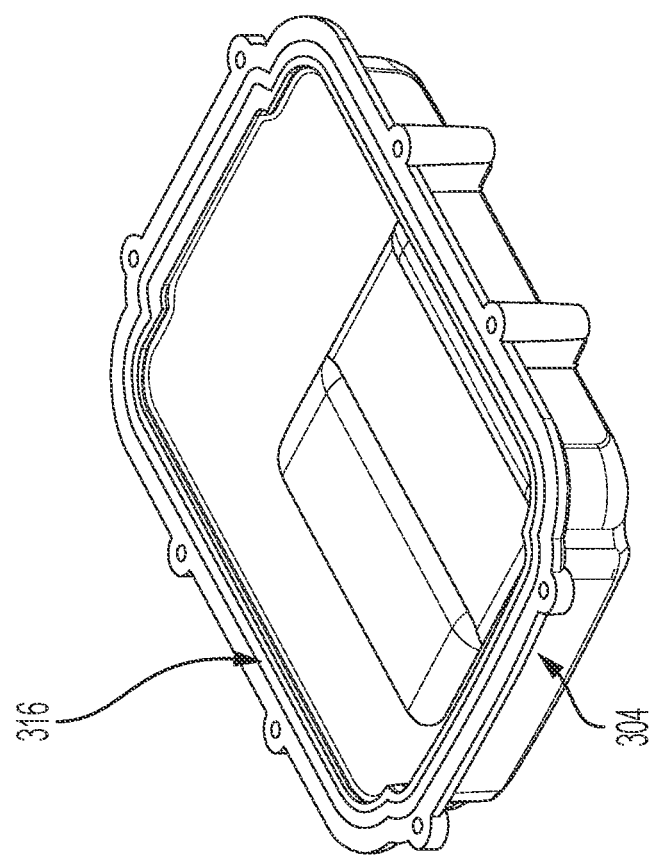
FIG. 39 is a front, right side isometric view of the lower housing of the battery pack of FIG. 35.
Figure 38:
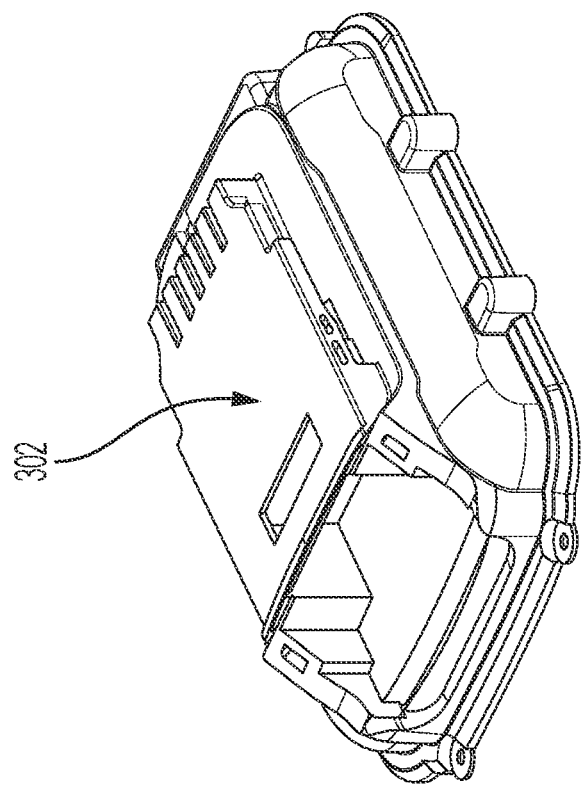
FIG. 38 is a front, right side isometric view of the upper housing of the battery pack of FIG. 35.
Figure 40:
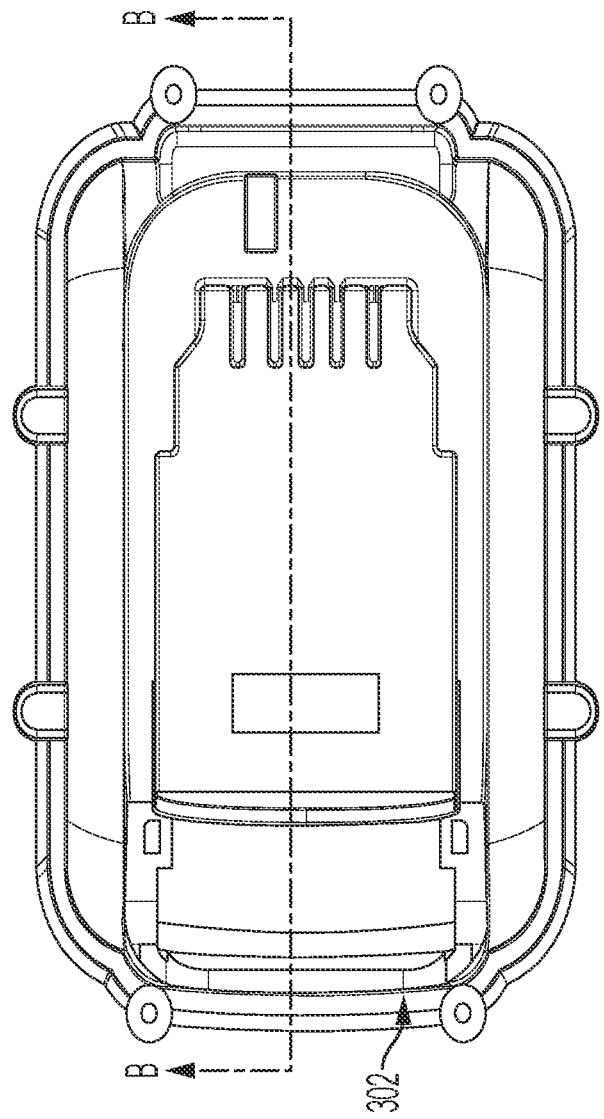
FIG. 40 is a top view of the upper housing of FIG. 38.
Figure 41:
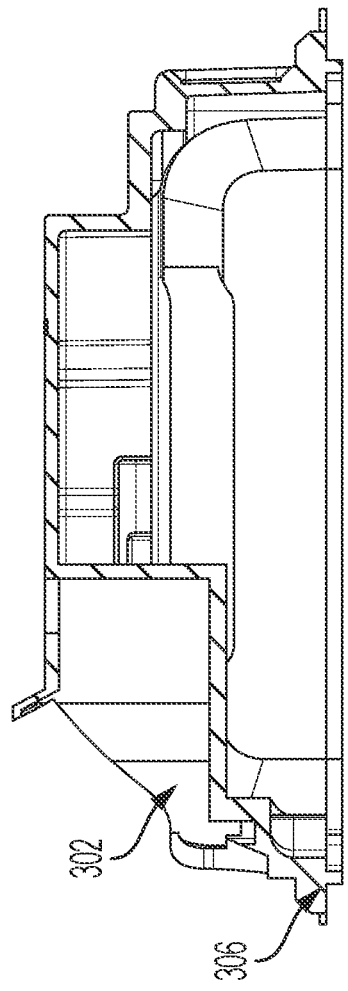
FIG. 41 is a section view along line B-B of the upper housing of FIG. 40.
Figure 43:
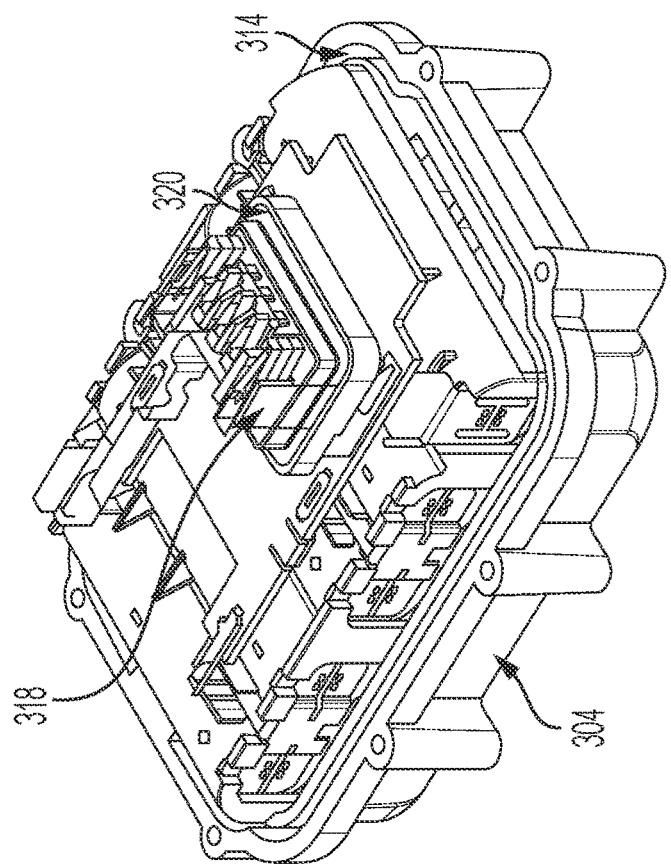
FIG. 43 is a rear, right side isometric view of the lower housing and core pack assembly of the battery pack of FIG. 35.
Figure 42:
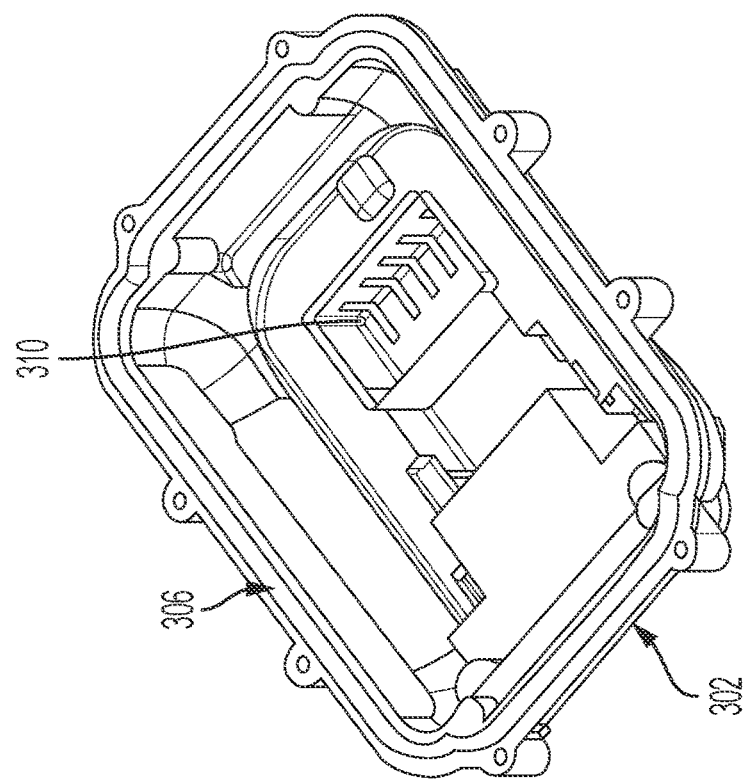
FIG. 42 is a front, left side isometric interior view of the upper housing of FIG. 40.
Figure 44:
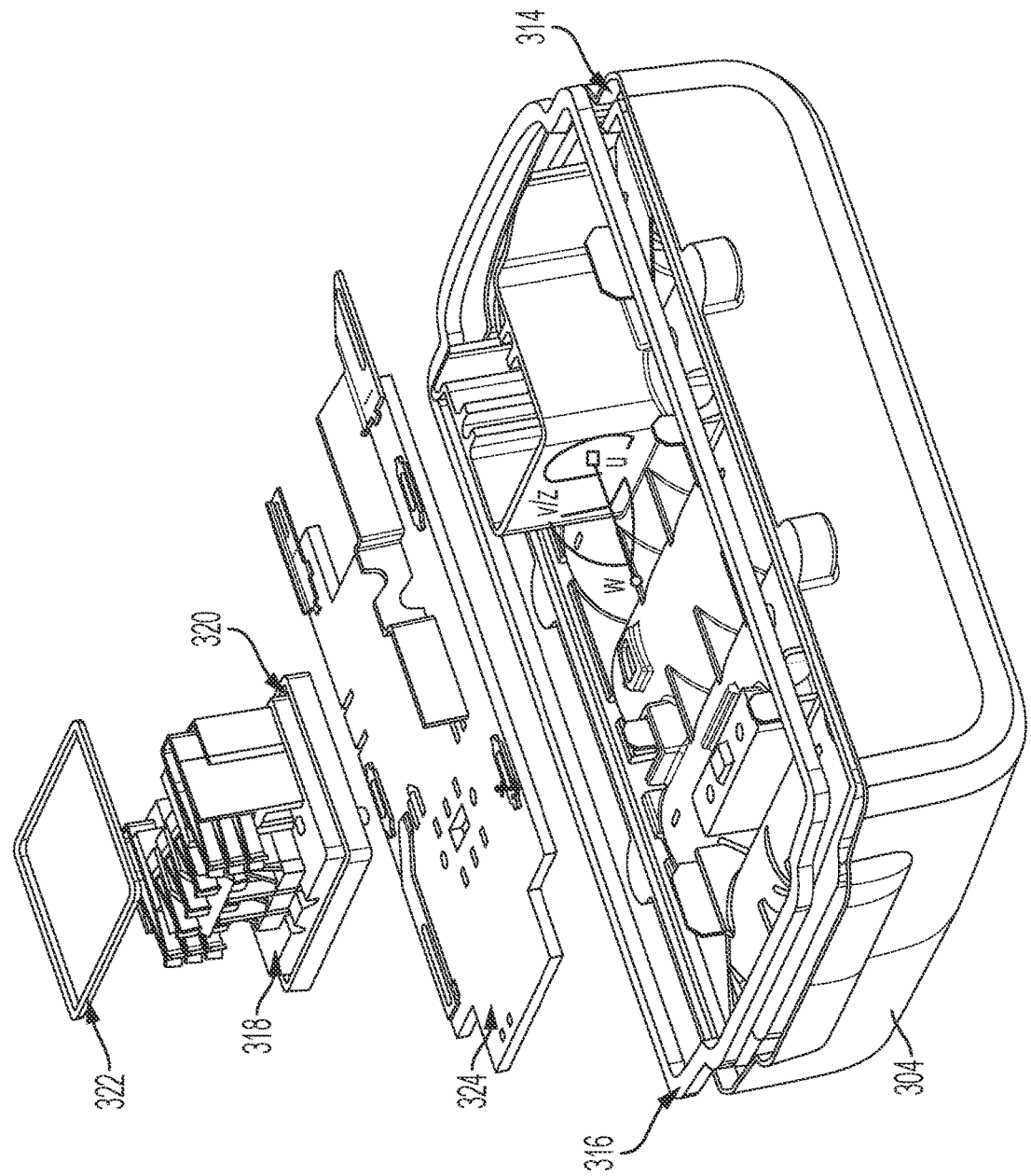
FIG. 44 a rear, left side exploded isometric view of the lower housing and core pack assembly of FIG. 43.
Figure 45:
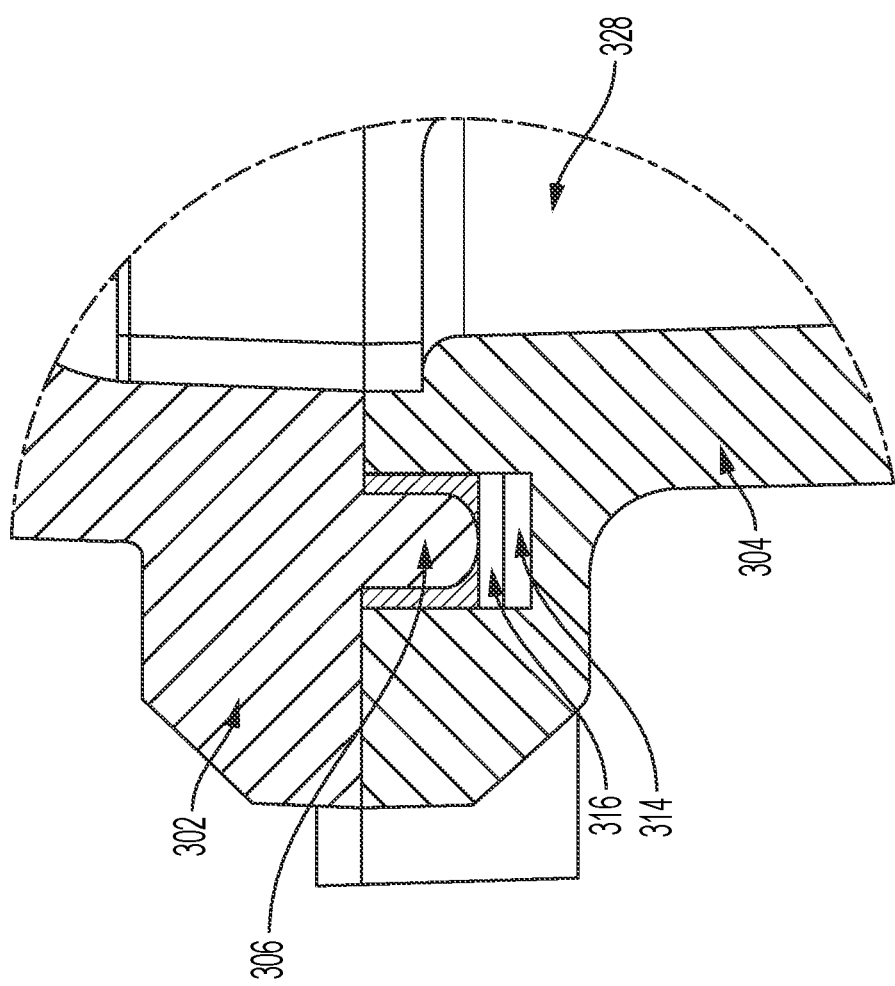
FIG. 45 is a is a section view at detail C of the battery pack of FIG. 37.
Figure 46:
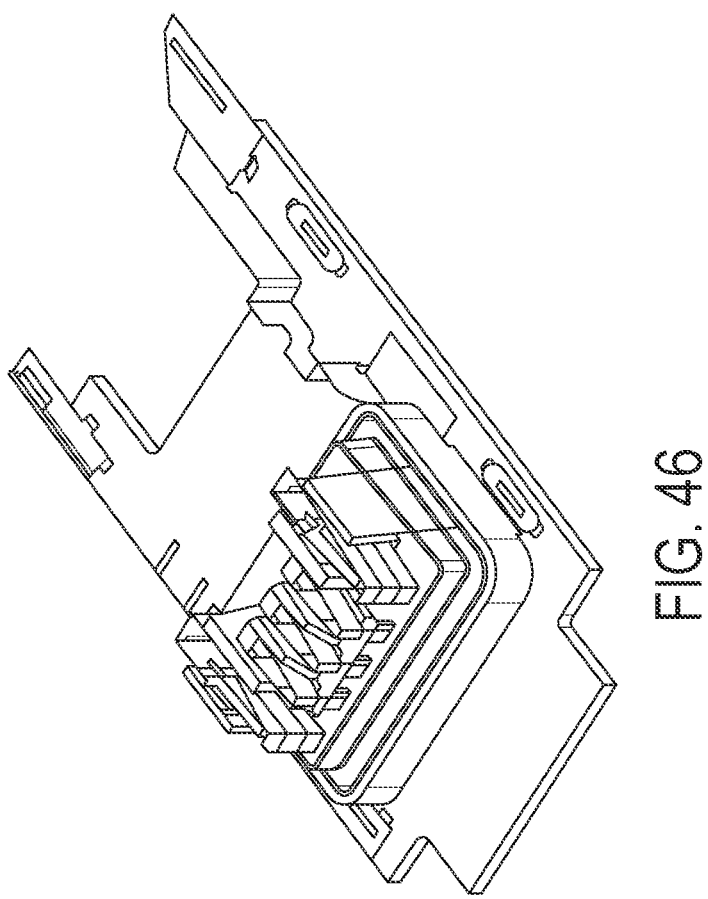
Figure 51:
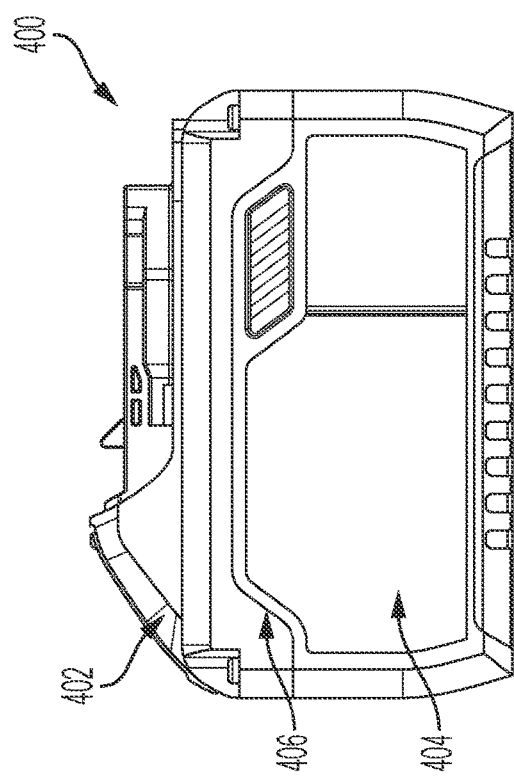
FIG. 51 is a left side elevation view of the battery pack of FIG. 47.
Figure 53:
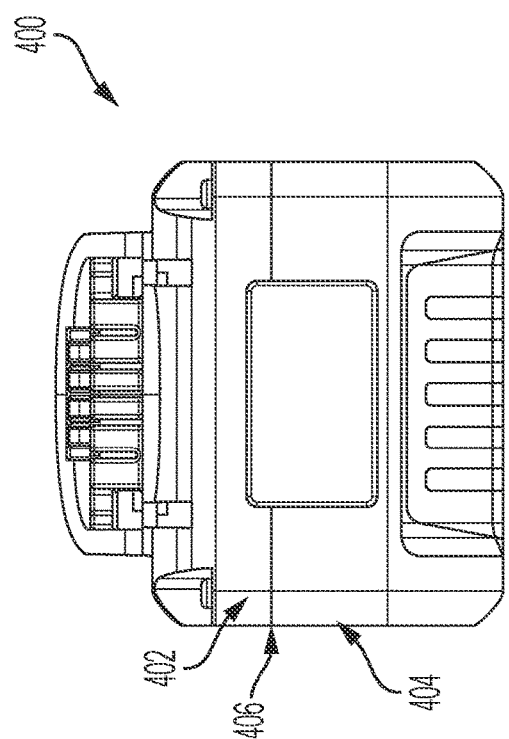
FIG. 53 is a front elevation view of the battery pack of FIG. 47.
Figure 52:
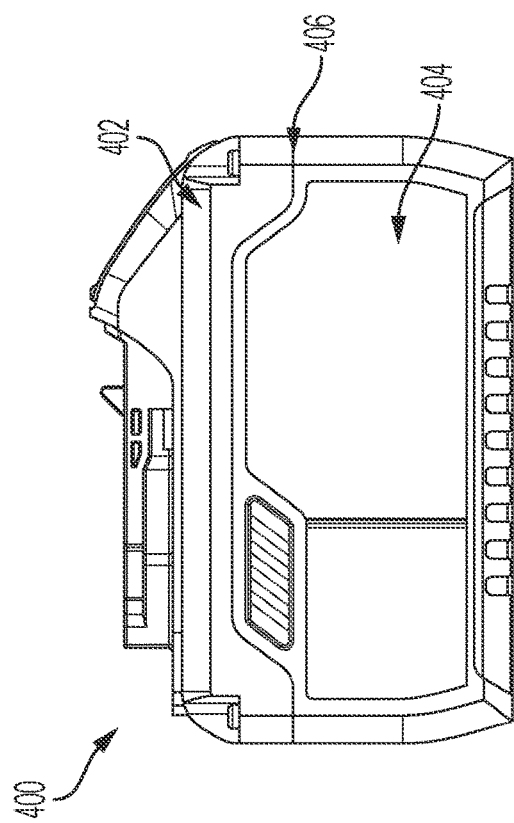
FIG. 52 is a right side elevation view of the battery pack of FIG. 47.
Figure 54:
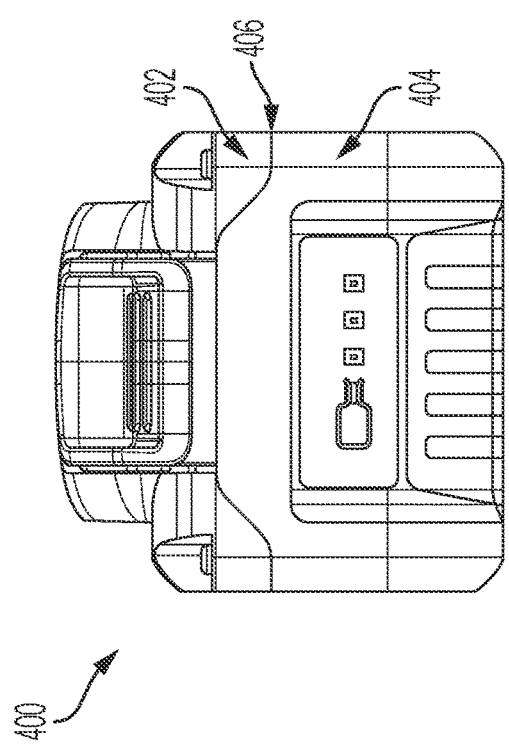
FIG. 54 is a rear elevation view of the battery pack of FIG. 47.

In another alternate embodiment, a battery pack 100″ includes a pressure release element 230 can be included to work in conjunction with the spring 198 and the spring holder 200 to release a build up of pressure in the core pack cavity 128. As illustrated in FIGS. 29, 30, 31A and 31B, a vent hole 232 is present in the first wall 184 at the spring holder recess 204. The hole 232 is covered and sealed by the pressure release element 230. The pressure release element 230 may be a spherical component. The pressure release element 230 may be made of a soft rubber or plastic. The pressure release element 230 is sized to fill/seal the vent hole 232 and at least partially fill an internal hollow portion of the spring holder 200. The spring 198, spring holder 200 and pressure release element 230 are designed such that under normal operating conditions—no gas venting into the core pack cavity 128—the spring 198 and the spring holder 200 will hold the pressure release element 230 such as to fill/seal the vent hole 232. This will keep the core pack cavity 128 fully sealed, as illustrated in FIG. 31A. The spring 198, spring holder 200 and pressure release 230 element are also designed such that once the pressure in the core pack cavity 128 reaches a predefined pressure threshold (a pressure less than would cause damage to the battery pack housing), the force of the gas pressure will overcome the spring constant of the spring 198 and force the pressure release element 230 to move the spring holder 200 and compress the spring 198 to open the vent hole 232, as illustrated in FIG. 31B. This allows gas to escape the core pack cavity 128 and reduce the pressure within the core pack cavity 128. Once the pressure inside the core pack cavity 128 is reduced to below the predefined pressure threshold—due to the escape of some gas—the spring 198 will expand and the pressure release element 230 will be forced back into the vent hole 232, once again sealing the core pack cavity 128.

As illustrated in FIGS. 32 and 33, in another alternate embodiment of a battery pack 100‴, a blow out notch 210 in the tongue compressing the O-ring is designed to provide spacing between the tongue and groove ensuring the proper release pressure. Part of the groove wall is removed and the material of the O-Ring material is selected to be sufficiently compliant to deform and release the pressure inside the core pack cavity. As illustrated in FIGS. 34A and 34B, in another alternate embodiment of a battery pack 100″″, the first tongue on the lower housing 104 and the second tongue on the sealing plate can be replaced by a third groove 240 (in place of the first tongue) and a fourth groove 240 (in place of the second tongue). A third O-ring 244 is then positioned in the third groove 240 and a fourth O-ring 246 is positioned in the fourth groove 242.

An alternate exemplary embodiment of a sealed battery pack 300 is illustrated in FIGS. 35-46. In this embodiment, the O-rings (O-ring 1 and O-ring 2) are replaced with a molded in place gasket. In this process, the lower housing 304 and the upper housing 302 are created by an injection molding process. This includes forming a first tongue 306 on the upper housing 302 at a mating line/parting line 308a interface surface about the perimeter of the upper housing 302 and a second tongue 310 on the upper housing 302 at an interior wall surface 312 (positioned to mate with a corresponding second groove in the terminal block). This also includes forming a first groove 314 in the lower housing 304 at a mating line/parting line interface surface 308b about the perimeter of the lower housing 304. Thereafter, a first gasket 316 is formed in the first groove 314 by another injection molding process. In addition, a terminal block 318 is created by an injection molding process. This includes forming a second groove 320 in the terminal block 318 about a perimeter of the terminal block 318. Thereafter, a second gasket 322 is formed in the second groove 320 by an injection molding process. The terminal block 318 and second gasket 322 subassembly is then assembled to a main PCB 324.

The main PCB is then assembled with a core pack 326. The core pack 326 is then assembled with the lower housing 304. The upper housing 302 is then assembled with the lower housing 304 using fasteners, such as screws. When the upper housing 302 is assembled with the lower housing 304 (as illustrated in section in FIG. 37) the first tongue 306 engages with the first gasket 316 to create a seal at the mating line interface 308 between the upper housing 302 and the lower housing 304. This, in part, seals the core pack cavity 328. Furthermore, when the upper housing 302 is assembled with the lower housing 304 the second tongue 310 engages with the second gasket 322 to create a seal at the interface between the upper housing interior wall 312 and the terminal block 318. This, in part, seals the core pack cavity 328.

Another exemplary embodiment of a battery pack 400 of the instant application is illustrated in FIGS. 47-64. This embodiment replaces the sealing plate described above with regard to FIGS. 1-26 and utilizes low pressure molding materials and processes to assist in sealing the core pack cavity.

This embodiment includes a battery pack housing 401. The battery pack housing 401 includes an upper housing 402 and a lower housing 404. The upper housing 402 and the lower housing 404 mate at a mating/parting line interface 406. Similar to the embodiment described above in FIGS. 1-26, this embodiment utilizes a tongue and groove and O-ring configuration at the mating/parting line interface. The upper housing 402 is formed/molded with a groove 408 around the perimeter 416 of the interface surface 412 and the lower housing 404 is formed/molded with a tongue 414 around the perimeter 416 of the interface surface 418. During the pack manufacturing process—described below—the O-ring 420 is positioned in the groove 408. When the upper housing 402 is assembled with the lower housing 404, a seal is formed between the upper and lower housings 402, 404 to prevent water and other contaminants from entering the core pack cavity 422 through the mating/parting interface 412, 418.

Similar to the embodiment described above with respect to FIGS. 1-26, this embodiment includes a latch area/cavity/pocket/volume 424 created in the upper housing 402 during molding process of the upper housing 402 by the formation of a plurality of walls 426a 426b, 426c, 426d to seal off the core pack cavity from the latch area/cavity 424.

As noted above, this embodiment utilizes an LPM material/process, such as Macromelt® to create a seal between the terminal slots 428 and the core pack cavity 422. The upper housing 402 is formed with an injection hole 428 between the fourth wall 426d of the latch cavity 424 and the terminal slots 428. A printed circuit board (PCB) module 432 is assembled with the upper housing 402. A first LPM volume/cavity/space 434 is created between the terminals slots 428, the latch cavity 424, a first side of the PCB module 432 and an interior surface 434 of the upper housing 402. The LPM material 436 is injected on both sides of the PCB module 432—into the first LPM volume 434 and a volume 438 between the PCB module 432 and the core pack cavity 422. The PCB module 432 may include a printed circuit board having a variety of electrical and electronic components and a terminal block subassembly mounted thereon and may also include an insulating board having a switching network, as described in U.S. Pat. No. 9,583,793.

Figure 55:
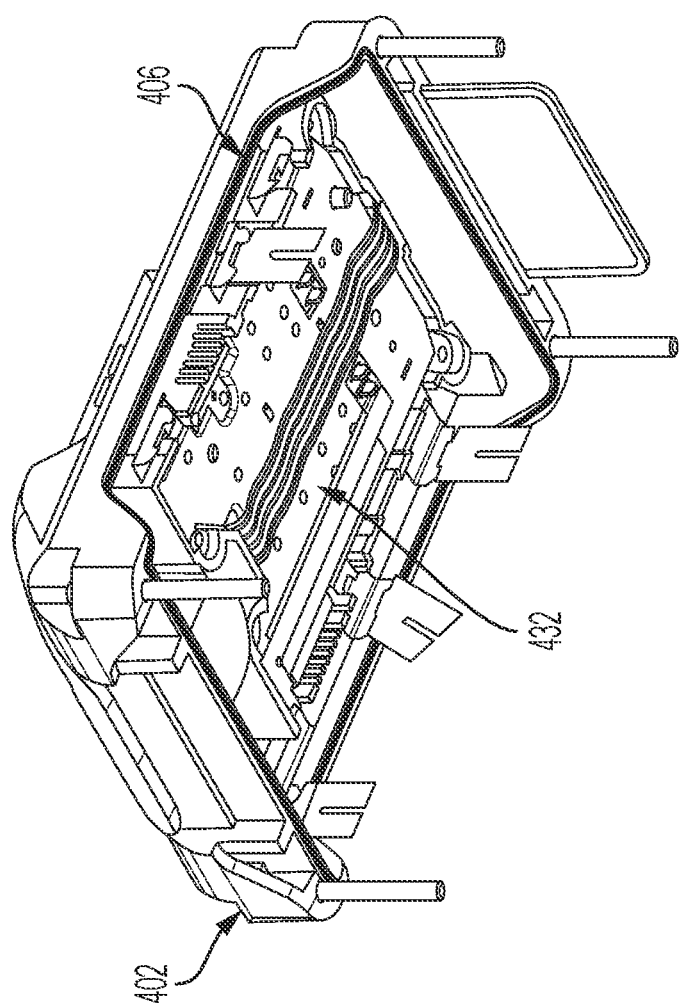
FIG. 55 is a front, right side isometric view of the upper housing of the battery pack of FIG. 47 and an electronics module assembly assembled together.
Figure 56:
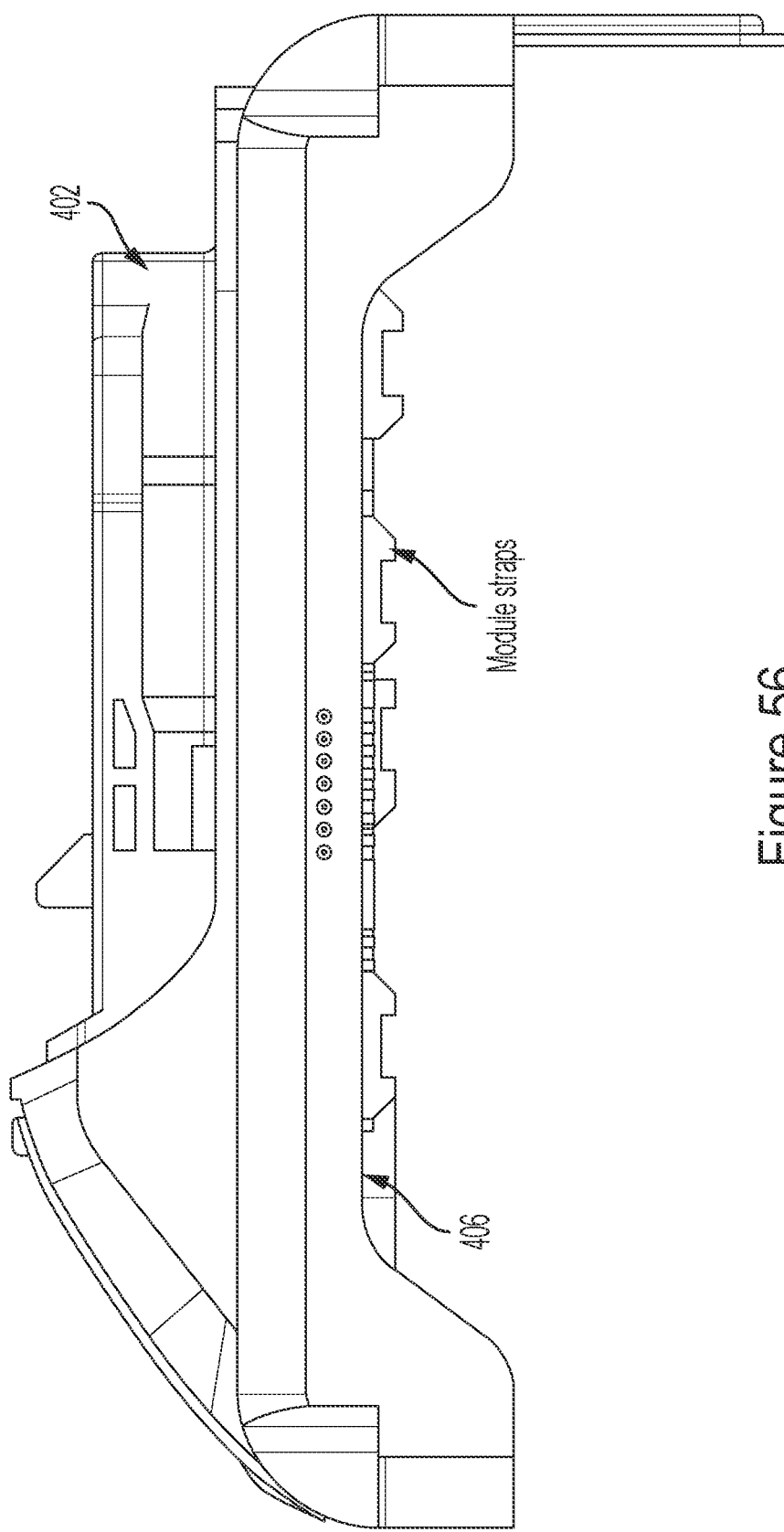
FIG. 56 is a side view of the assembly of FIG. 55.
Figure 57:
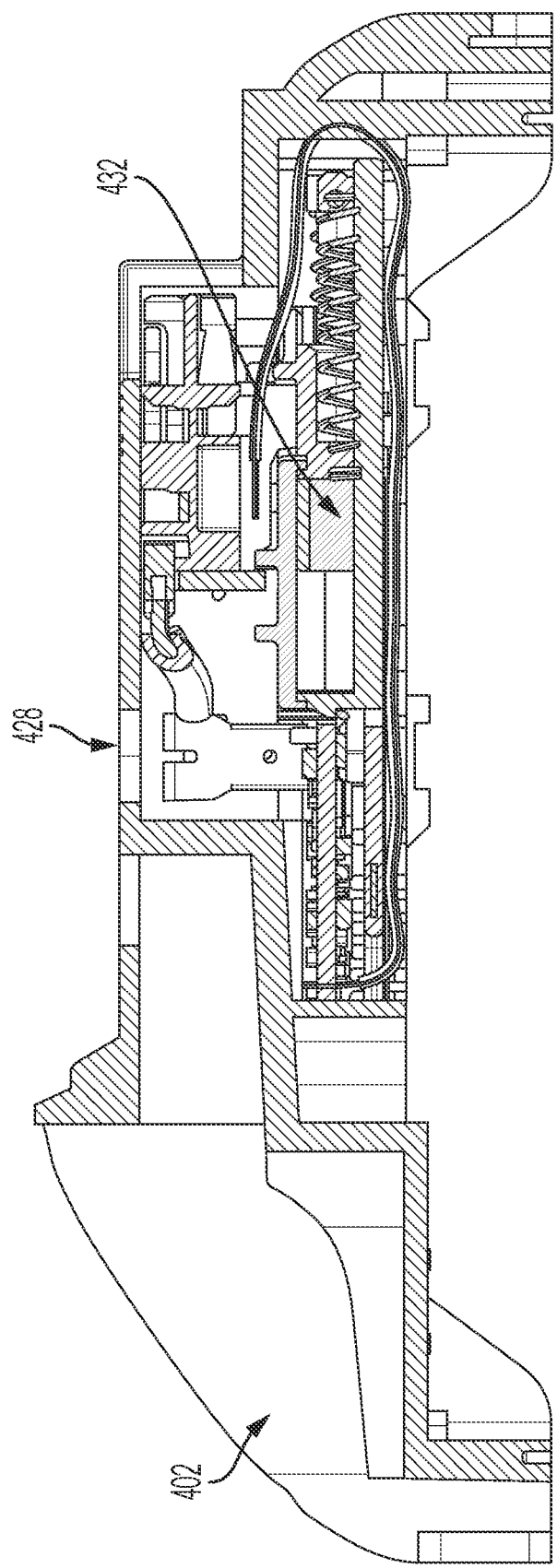
FIG. 57 is a section view of the assembly of FIG. 55 taken along section line A-A of FIG. 50.
Figure 58:
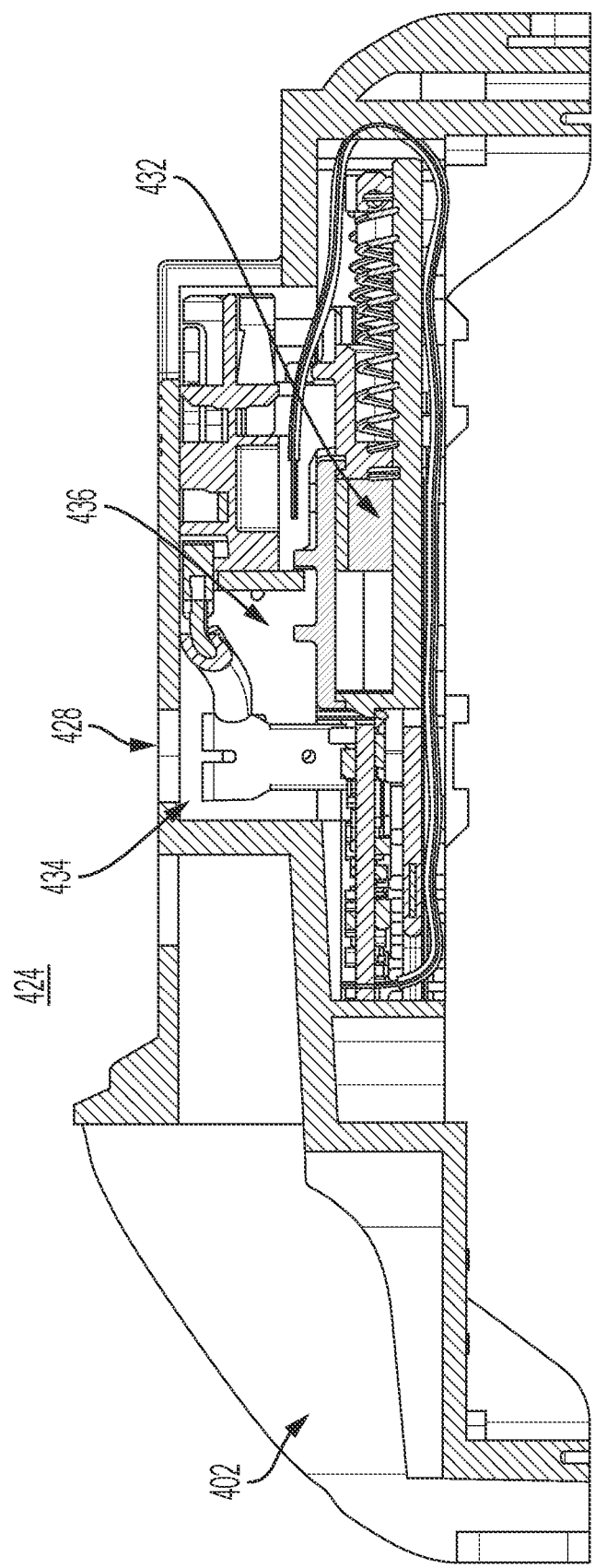
FIG. 58 is a section view of the assembly of FIG. 57 including a first volume of low pressure molded material.
Figure 59:
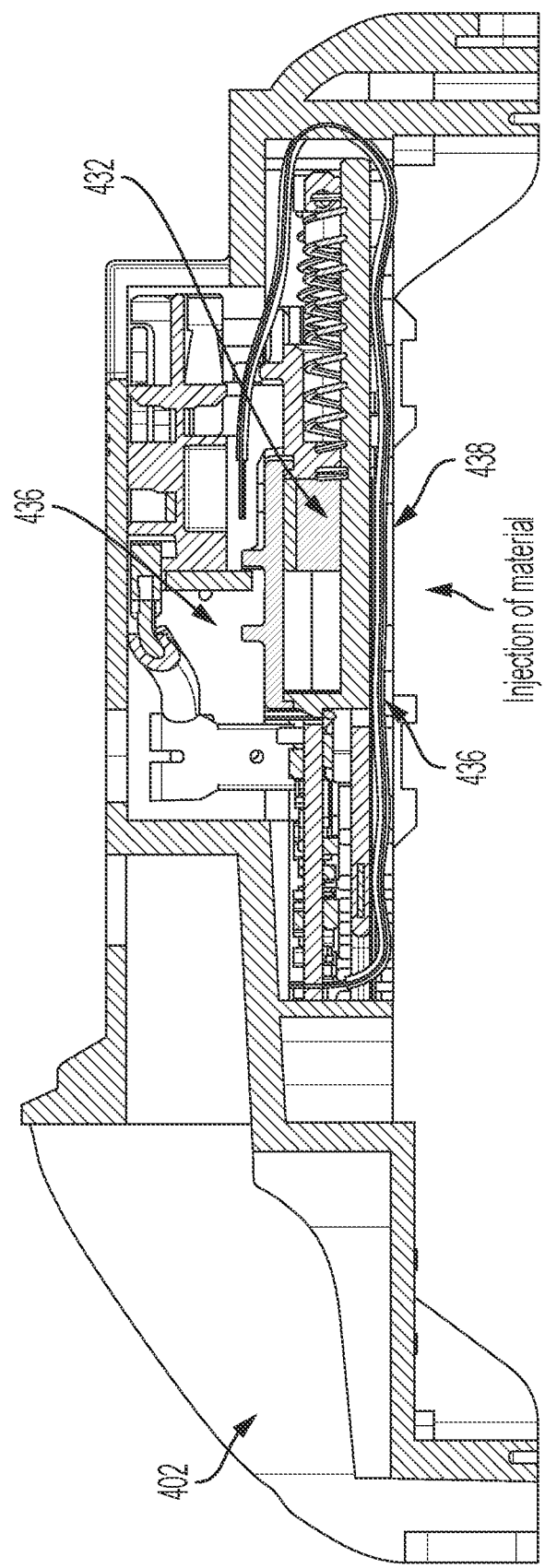
FIG. 59 is a section view of the assembly of FIG. 58 including the first volume of low pressure molded material and a second volume of low pressure molded material.
Figure 60:
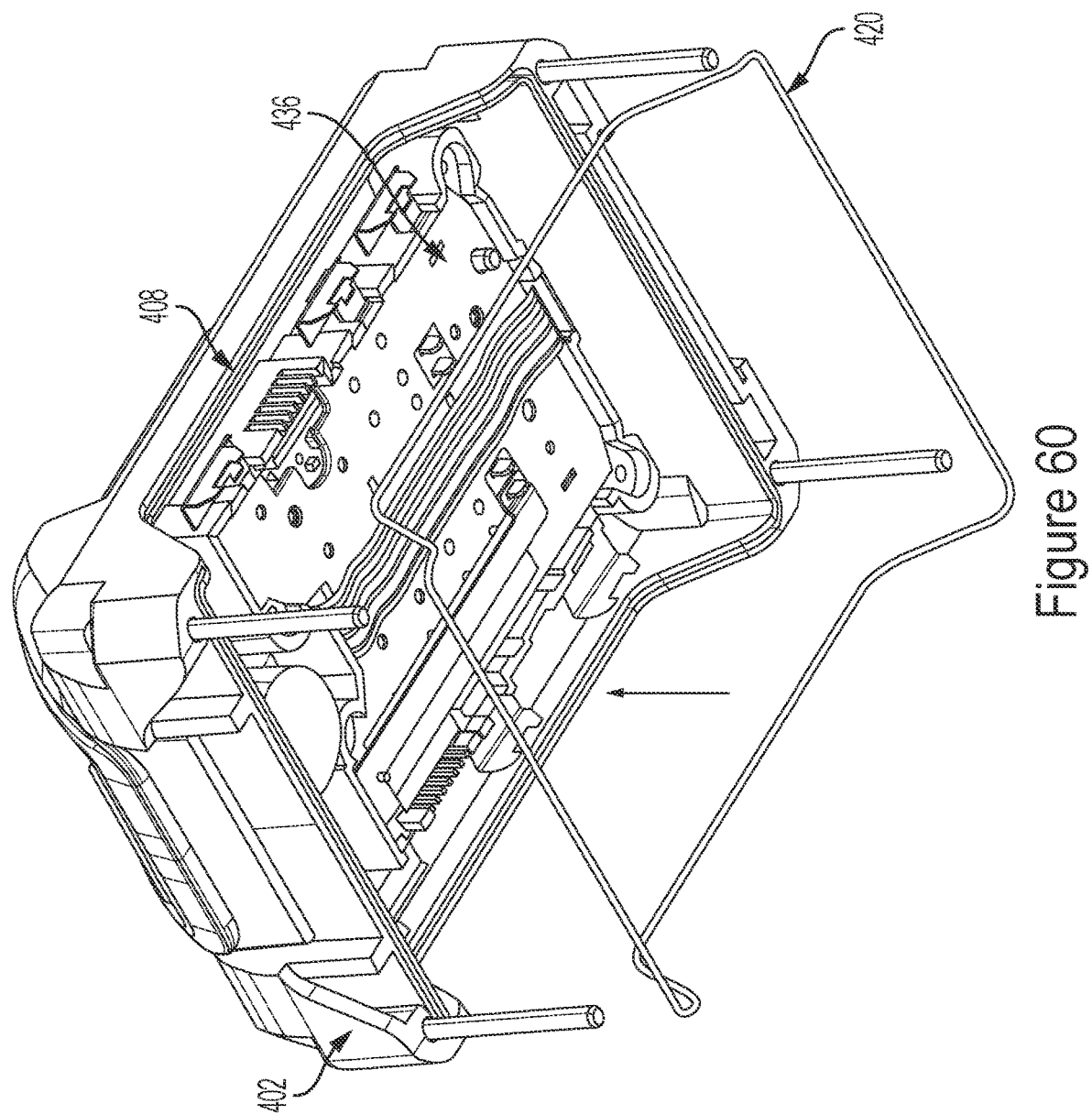
FIG. 60 is a front, right side isometric view of the assembly of FIG. 59 and an O-ring prior to assembly.
Figure 62:
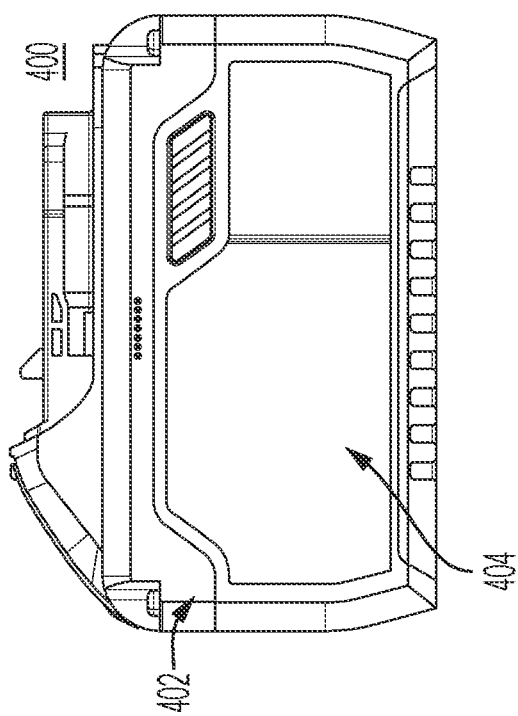
FIG. 62 is a side elevation view of the battery pack of FIG. 47.
Figure 61:
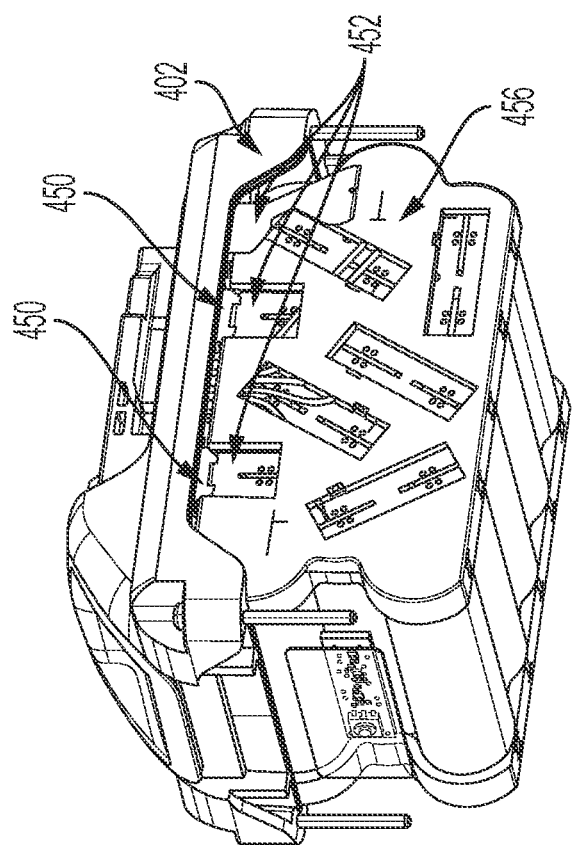
FIG. 61 is a front, right side isometric view of the assembly of FIG. 59 after the O-ring and a core pack have been assembly with the upper housing.
Figure 63:
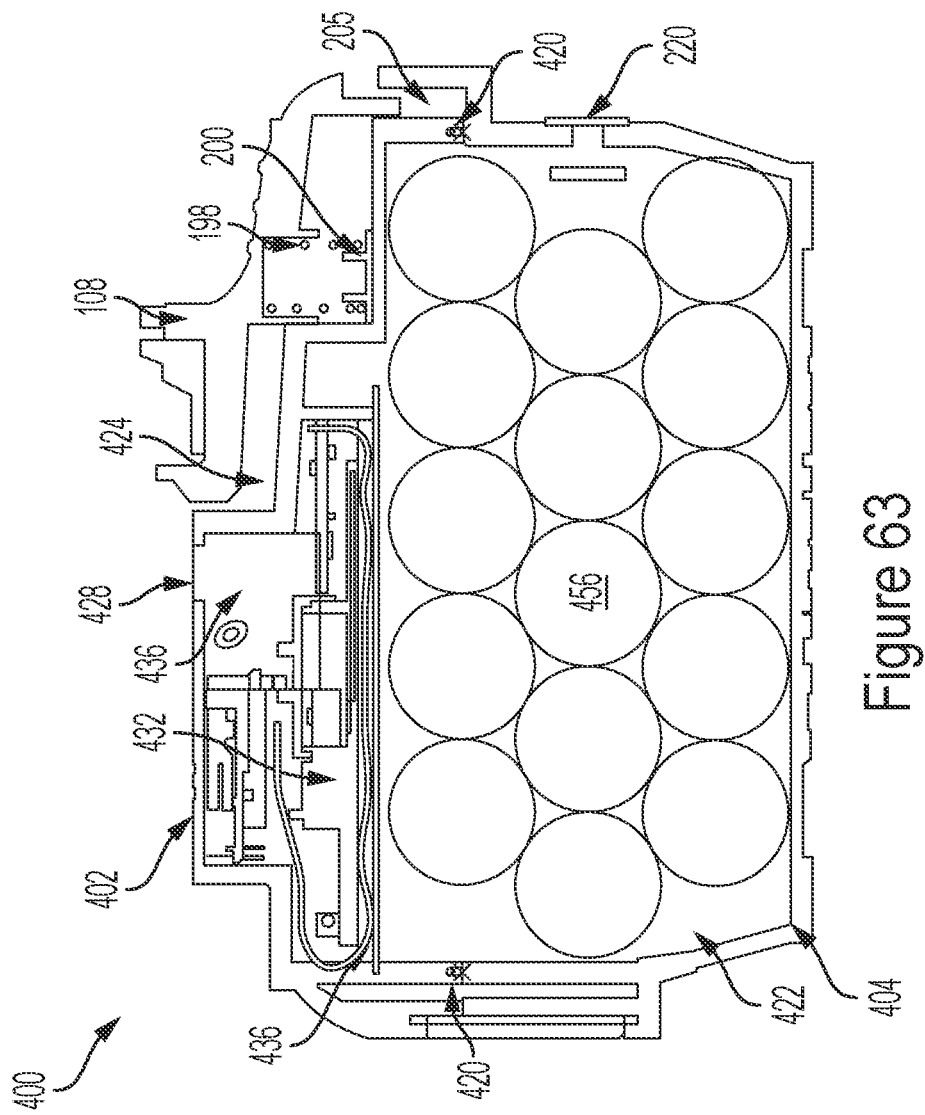
FIG. 63 is a section view along section line A-A of FIG. 50.

The manufacture process for creating the pack is as follows:

1) Mold the upper and lower housings through an injection molding process
2) Remove the upper and lower housings from the mold
3) Insert the PCB module in the upper housing (the result of this step is illustrated in FIGS. 55, 56 and 57) creating an upper housing assembly
4) Place a next mold adjacent to an underside of the PCB module/interior of upper housing so at to not allow LPM material between the mold and the PCB module
5) Inject LPM material through the injection hole in upper housing (the result of this step is illustrated in FIG. 58)
6) Remove the upper housing assembly from the mold and place a next mold adjacent to the underside of the PCB module/interior of upper housing with space between the mold and the PCB module to allow for LPM material between the mold and the PCB module
7) Inject LPM material between the mold and the PCB module (the result of this step is illustrated in FIG. 59)
8) Remove upper housing assembly having LPM material on both sides of the PCB module from the mold
9) Insert an O-ring in the groove in the upper housing (as illustrated in FIG. 60)
10) Assemble latch with the upper housing
11) Assemble core pack to upper housing and solder/weld the PCB module straps to the core pack straps and the sense lines to the intra-cell straps (the result of this step is illustrated in FIG. 61)
12) Assemble the lower housing to the upper housing (the result of this step is illustrated in FIG. 62)

As illustrated in FIGS. 56, 57, and 61, the PCB module straps 450—which are connected to the power terminals 116a through the PCB module 432—extend below the upper housing mating/parting line interface 406. This allows the PCB module straps 450 to be connected (soldered/welded) to the core pack straps 452 after the core pack 456 is assembled with the upper housing assembly 402. This is necessary because in order to seal the PCB module 432 with the LPM material 436, the PCB module 432 must be assembled with the upper housing 402 prior to assembly of the core pack 456 and the PCB module 432 to allow for the LPM process. If the PCB module straps 450 did not extend below the mating/parting line interface 406 the connection location for the PCB module straps 450 and the core pack straps 452 would not be accessible to soldering/welding tools.

Figure 64:
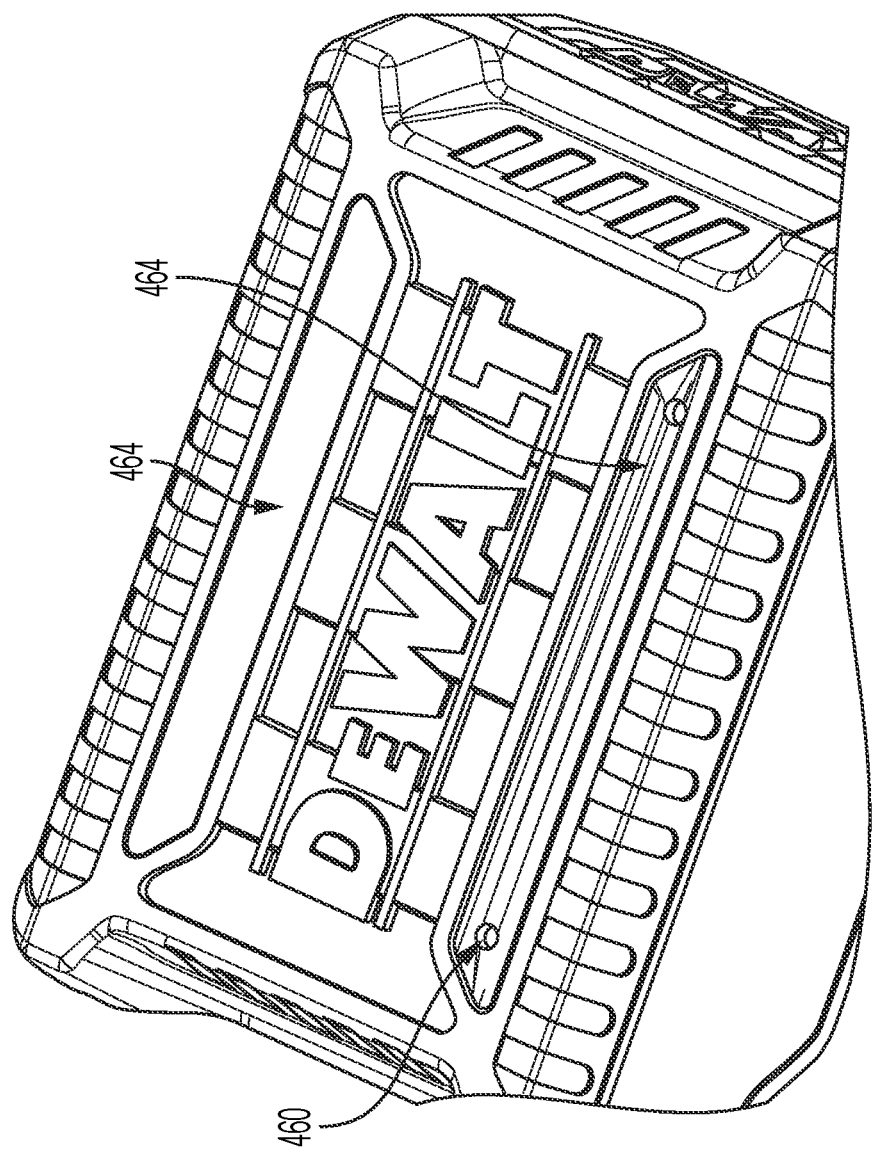
FIG. 64 is a bottom isometric view of the of the battery pack of FIG. 47.

As noted above, when battery cells fail, they vent gas as part of their failure and safety mechanism to release pressure inside the battery cell. In a sealed cavity—such as the core pack cavity in this pack—this release of pressure inside the cell and build up of gas inside the core pack cavity increases the pressure in the core pack cavity. As such, it is important to have a means of venting the gas from the core pack cavity. An exemplary manner in which the gas may be vented is illustrated in FIG. 64. In this manner, four pressure release openings/holes 460 are created/present in a bottom wall 462 of the lower housing 404. The openings 460 are covered by labels 464 that are fixed to an exterior surface of the bottom wall 462. The labels 464 and the adhesive adhering the labels 464 to the bottom wall 462 are selected to maintain the seal of the core pack cavity 422 during normal operating conditions of the battery pack 400 and normal pressure levels within the core pack cavity 422. However, the labels 464 and the adhesive are also selected to release from the bottom wall 462 of the lower housing 404 when the pressure in the core pack cavity 422 exceeds a predefined pressure threshold to allow the gas in the core pack cavity 422 to vent from the battery pack 400 to the environment outside the battery pack 400.

Numerous modifications may be made to the exemplary implementations described above. These and other implementations are within the scope of this application.

The invention claimed is:

1. A battery pack comprising:
 a housing comprising a lower housing and upper housing assembled together at a parting line to form an internal cavity;
 the lower housing and the upper housing each including a mating surface, wherein the mating surface of the lower housing mates with the mating surface of the upper housing at the parting line;
 a groove formed in one of the lower housing mating surface and the upper housing mating surface and a tongue formed in the other of the lower housing mating surface and the upper housing mating surface;
 a sealing material positioned in the groove to provide a seal between the lower housing and the upper housing when the lower housing and the upper housing are assembled;
 a terminal block;
 a sealing material surrounding the terminal block; and
 a wall extending from an interior surface of the upper housing wherein the wall mates with the sealing material surrounding the terminal block.

2. The battery pack, as recited in claim 1, wherein the sealing material positioned in the groove is an O-ring.

3. The battery pack, as recited in claim 1, wherein the sealing material is molded in place in the groove.

4. The battery pack, as recited in claim 1, wherein the sealing material surrounding the terminal block is an O-ring.

5. The battery pack, as recited in claim 1, wherein the sealing material surrounding the terminal block is a potting material.

6. The battery pack, as recited in claim 5, wherein the potting material is a low pressure mold material.

7. The battery pack, as recited in claim 1, further comprising a latch receiving cavity formed in the upper housing and a latch for affixing the housing to an external device, the latch received in the latch receiving cavity, the latch receiving cavity sealed from the internal cavity.

* * * * *